(12) United States Patent
Kimura

(10) Patent No.: US 11,768,539 B2
(45) Date of Patent: Sep. 26, 2023

(54) INFORMATION PROCESSING SYSTEM, INFORMATION PROCESSING APPARATUS, AND NON-TRANSITORY COMPUTER READABLE MEDIUM

(71) Applicant: Agama-X Co., Ltd., Tokyo (JP)

(72) Inventor: Tsutomu Kimura, Tokyo (JP)

(73) Assignee: Agama-X Co., Ltd., Tokyo (JP)

( * ) Notice: Subject to any disclaimer, the term of this patent is extended or adjusted under 35 U.S.C. 154(b) by 415 days.

(21) Appl. No.: 16/400,314

(22) Filed: May 1, 2019

(65) Prior Publication Data

US 2019/0346923 A1 Nov. 14, 2019

(30) Foreign Application Priority Data

May 8, 2018 (JP) .................................. 2018-090200

(51) Int. Cl.
| | | |
|---|---|---|
| *G06F 3/01* | (2006.01) | |
| *H04R 3/04* | (2006.01) | |
| *H04R 5/033* | (2006.01) | |
| *H04R 5/04* | (2006.01) | |

(52) U.S. Cl.
CPC .............. *G06F 3/015* (2013.01); *H04R 3/04* (2013.01); *H04R 5/033* (2013.01); *H04R 5/04* (2013.01); *H04R 2420/07* (2013.01)

(58) Field of Classification Search
CPC ........... G06F 3/015; H04R 3/04; H04R 5/033; H04R 5/04; H04R 2420/07; H04R 1/1041
See application file for complete search history.

(56) References Cited

U.S. PATENT DOCUMENTS

| | | | |
|---|---|---|---|
| 5,036,858 A * | 8/1991 | Carter .................... | A61B 5/375 600/545 |
| 8,792,975 B2 | 7/2014 | Kato et al. | |
| 2005/0049452 A1* | 3/2005 | Lawlis ................. | A61M 21/00 600/28 |
| 2012/0244917 A1 | 9/2012 | Hosoi et al. | |
| 2013/0202119 A1 | 8/2013 | Thiede | |
| 2014/0347265 A1* | 11/2014 | Aimone ................ | H04W 4/029 345/156 |
| 2015/0016618 A1 | 1/2015 | Adachi et al. | |
| 2017/0196474 A1 | 7/2017 | Garcia Molina et al. | |
| 2018/0133507 A1* | 5/2018 | Malchano .......... | A61N 1/36092 |

FOREIGN PATENT DOCUMENTS

| | | |
|---|---|---|
| JP | 2011-217986 A | 11/2011 |
| JP | 4861538 B2 | 1/2012 |
| JP | 2014-507889 A | 3/2014 |
| JP | 5579352 B1 | 8/2014 |
| JP | 2017-526406 A | 9/2017 |

OTHER PUBLICATIONS

English Machine Translation of Japanese Notice of Reasons for Refusal for corresponding JP Application No. 2019-068551 dated Oct. 4, 2022, 9 pages.

\* cited by examiner

*Primary Examiner* — Cesar B Paula
*Assistant Examiner* — John M Heffington
(74) *Attorney, Agent, or Firm* — Hoffman Warnick LLC

(57) ABSTRACT

An information processing system includes a measurement unit, an output unit, and a reception unit. The measurement unit measures brain waves of a user. The output unit outputs a sound to the user. The reception unit receives a command to correct the sound in a case where the sound is output while the brain waves are being measured.

17 Claims, 17 Drawing Sheets

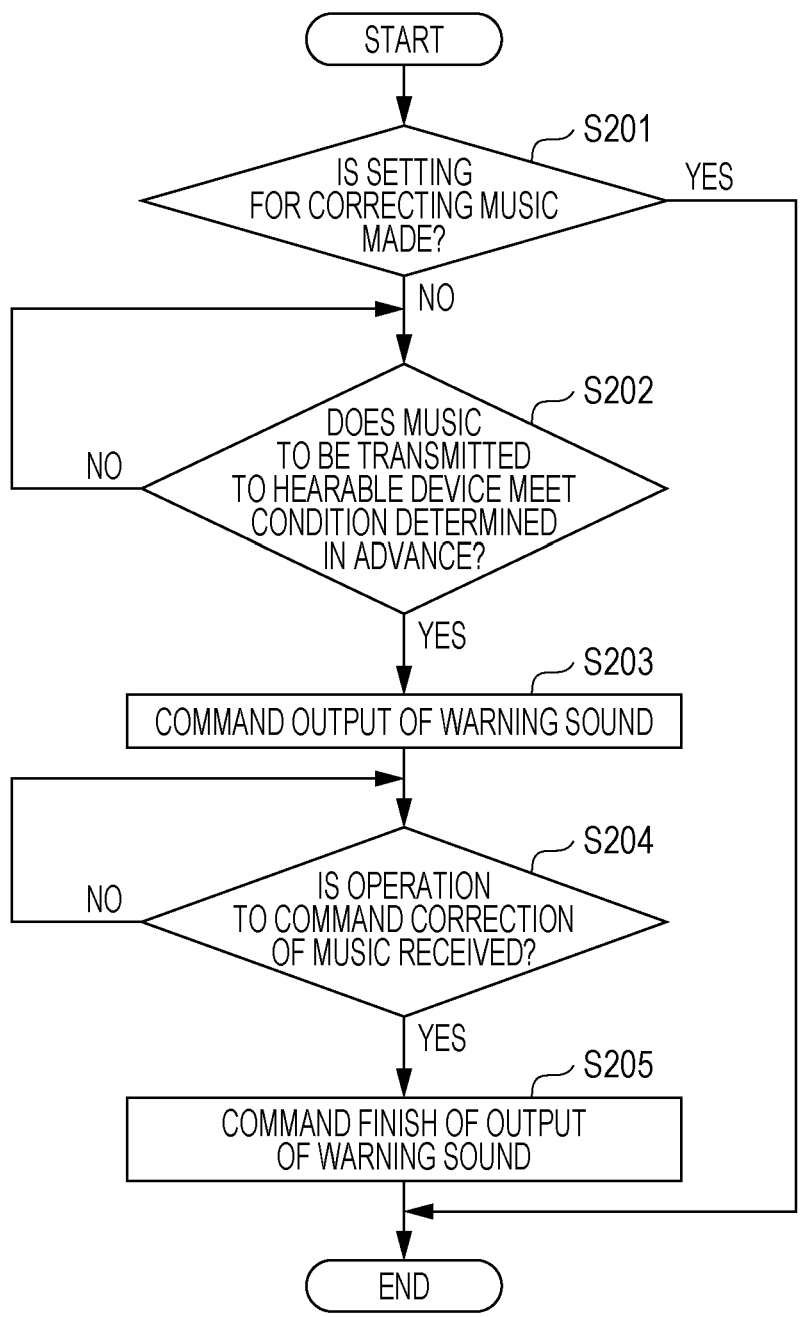

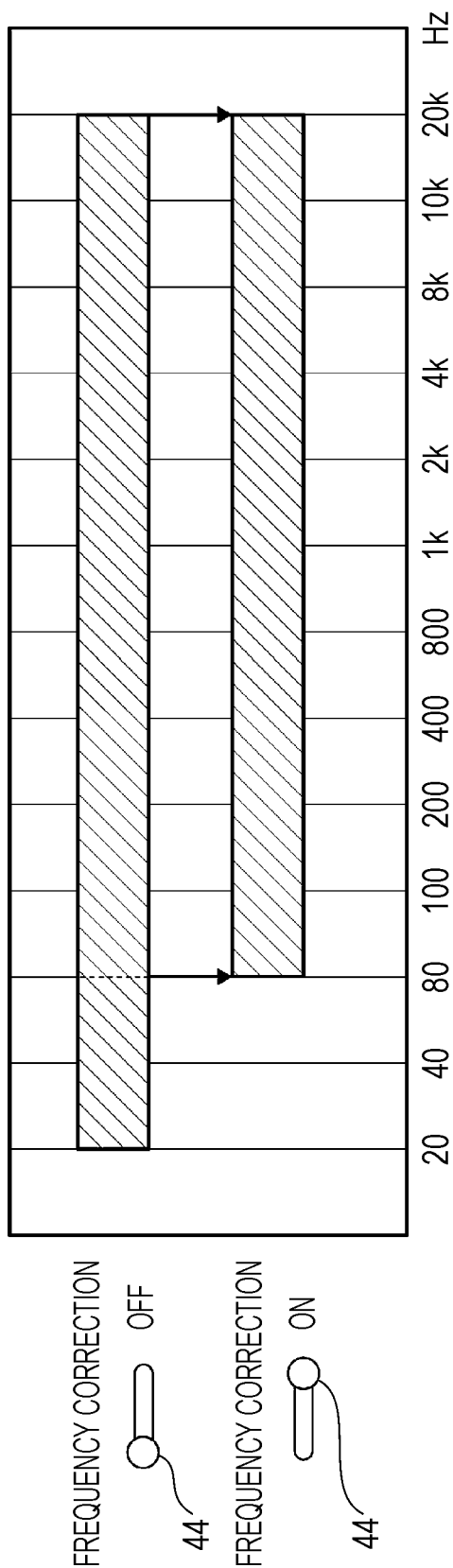

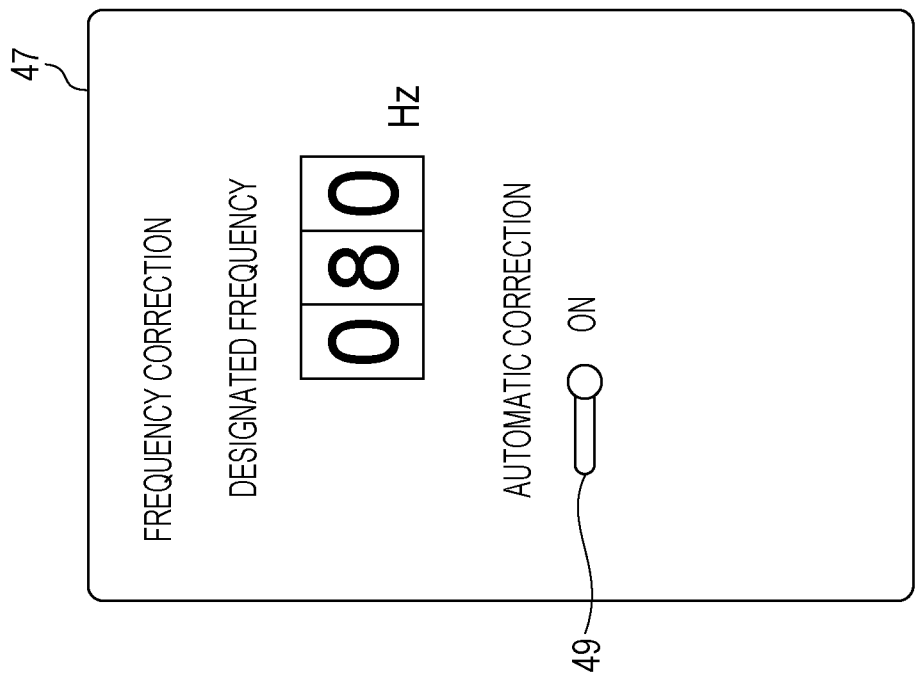
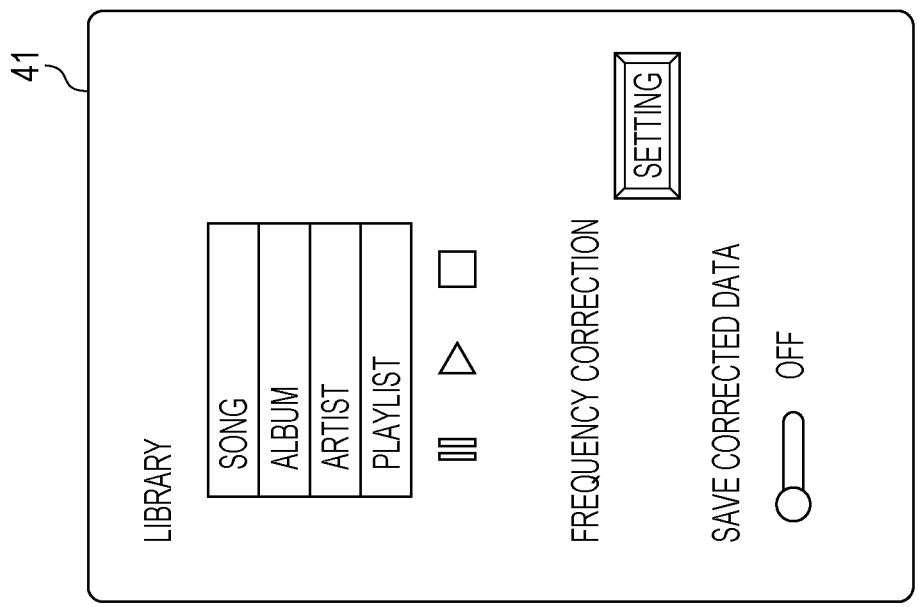

INFORMATION PROCESSING SYSTEM, INFORMATION PROCESSING APPARATUS, AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-090200 filed May 8, 2018.

BACKGROUND

(i) Technical Field

The present disclosure relates to an information processing system, an information processing apparatus, and a non-transitory computer readable medium.

(ii) Related Art

Japanese Patent No. 4861538, for example, discloses a brain wave measurement device that includes a brain wave measurement unit that measures the brain waves of a user, an electroacoustic converter that presents an acoustic signal to the user, and a noise estimation unit that estimates electric noise mixed into an electrode from the electroacoustic converter.

SUMMARY

If a sound such as music is output, for example, when measuring the brain waves of the user, the frequency of the output sound occasionally overlaps the frequency of the brain waves, and the brain waves may not be measured accurately.

Aspects of non-limiting embodiments of the present disclosure relate to measuring brain waves while reducing the effect of a sound.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including: a measurement unit that measures brain waves of a user; an output unit that outputs a sound to the user; and a reception unit that receives a command to correct the sound in a case where the sound is output while the brain waves are being measured.

BRIEF DESCRIPTION OF THE DRAWINGS

An exemplary embodiment of the present disclosure will be described in detail based on the following figures, wherein:

FIG. 6B is a flowchart illustrating an example of the procedure of a process performed by the user terminal.

FIG. 9 illustrates an example of correction of music;

FIGS. 13A and 13B each illustrate an example of a screen for a case where correction of music is started automatically;

DETAILED DESCRIPTION

An exemplary embodiment of the present disclosure will be described in detail below with reference to the accompanying drawings.

<Configuration of Entire System>

Figure 1:
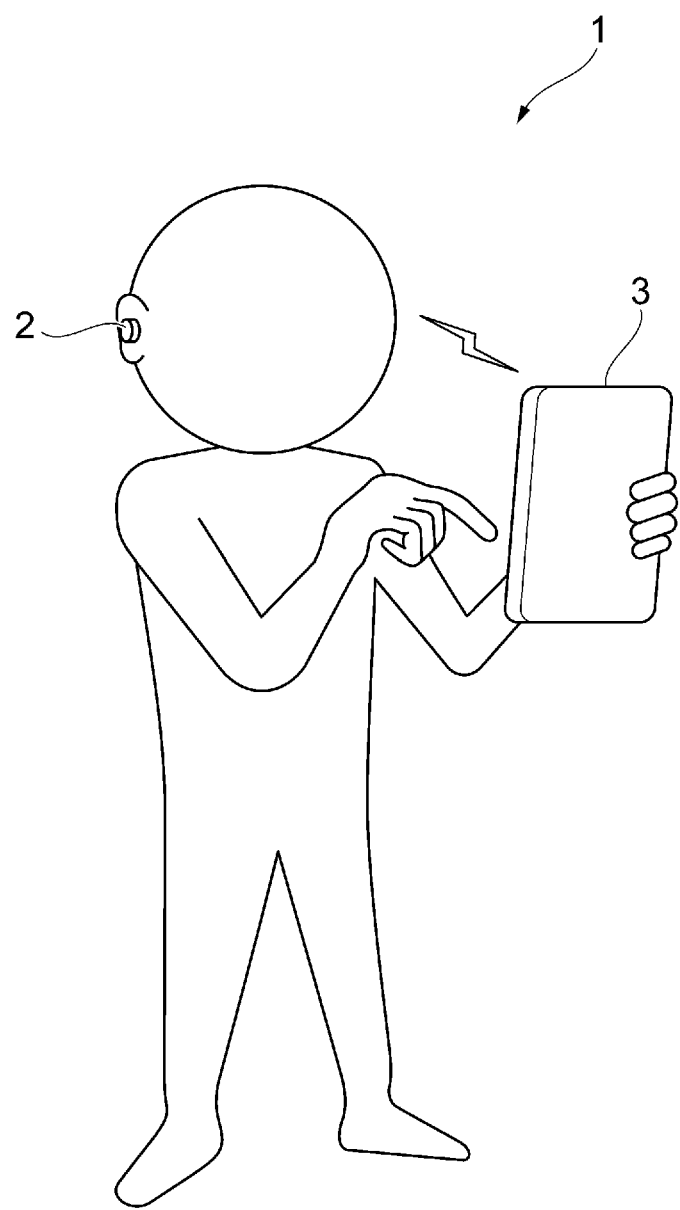
FIG. 1 illustrates an example of the configuration of the entire brain wave measurement system according to an exemplary embodiment.

First, the configuration of the entire brain wave measurement system 1 according to the exemplary embodiment will be described. FIG. 1 illustrates an example of the configuration of the entire brain wave measurement system 1 according to the exemplary embodiment.

As illustrated in the drawing, the brain wave measurement system 1 includes a hearable device 2 that measures (senses) the brain waves of a user, and a user terminal 3 that receives an operation from the user. In the present embodiment, the brain wave measurement system 1 is used as an example of the information processing system. Meanwhile, the hearable device 2 is used as an example of the information processing apparatus.

Wireless communication is performed between the hearable device 2 and the user terminal 3. More specifically, the hearable device 2 and the user terminal 3 are paired and communicate with each other through Bluetooth (registered trademark). It should be noted, however, that the method of communication between the hearable device 2 and the user terminal 3 is not limited to a method that uses Bluetooth, and a different wireless technology may also be used. Alternatively, the hearable device 2 and the user terminal 3 may be connected and communicate with each other through a wire.

The hearable device 2 has an earphone shape, and is mounted to an ear of the user who is the subject of measurement of brain waves. The hearable device 2 measures the brain waves of the user, and transmits information on the measured brain waves to the user terminal 3. The brain waves are measured on the basis of the information on a potential detected by a brain wave sensor 24 (see FIG. 2) to be discussed later.

In addition, the hearable device 2 receives data on music from the user terminal 3, and outputs the music to the user. When the user designates a desired state (e.g. a concentrating state, a relaxed state, or the like) using the user terminal 3 or the like, for example, the hearable device 2 outputs music that brings the user to the designated state.

In this manner, the hearable device 2 measures the brain waves of the user, and outputs music to the user. When the frequency of the music which is output from the hearable device 2 overlaps the frequency of the brain waves, such music serves as noise for measurement of the brain waves, and it is conceivable that the brain waves of the user may not be measured accurately. Thus, in the present embodiment, the user terminal 3 corrects the music. Then, the hearable device 2 receives the corrected music from the user terminal 3, and outputs the corrected music to the user.

The user terminal 3 is a terminal device that receives an operation from the user. Examples of the user terminal 3 include a portable information terminal such as a tablet computer and a smartphone. The user terminal 3 receives information on the brain waves of the user from the hearable device 2. In addition, the user terminal 3 transmits data on music to the hearable device 2. Further, in the case where a setting for correcting music is made when the music is output while brain waves are being measured, the user terminal 3 corrects the music, and transmits data on the corrected music to the bearable device 2.

<Hardware Configuration of Hearable Device>

Figure 2:
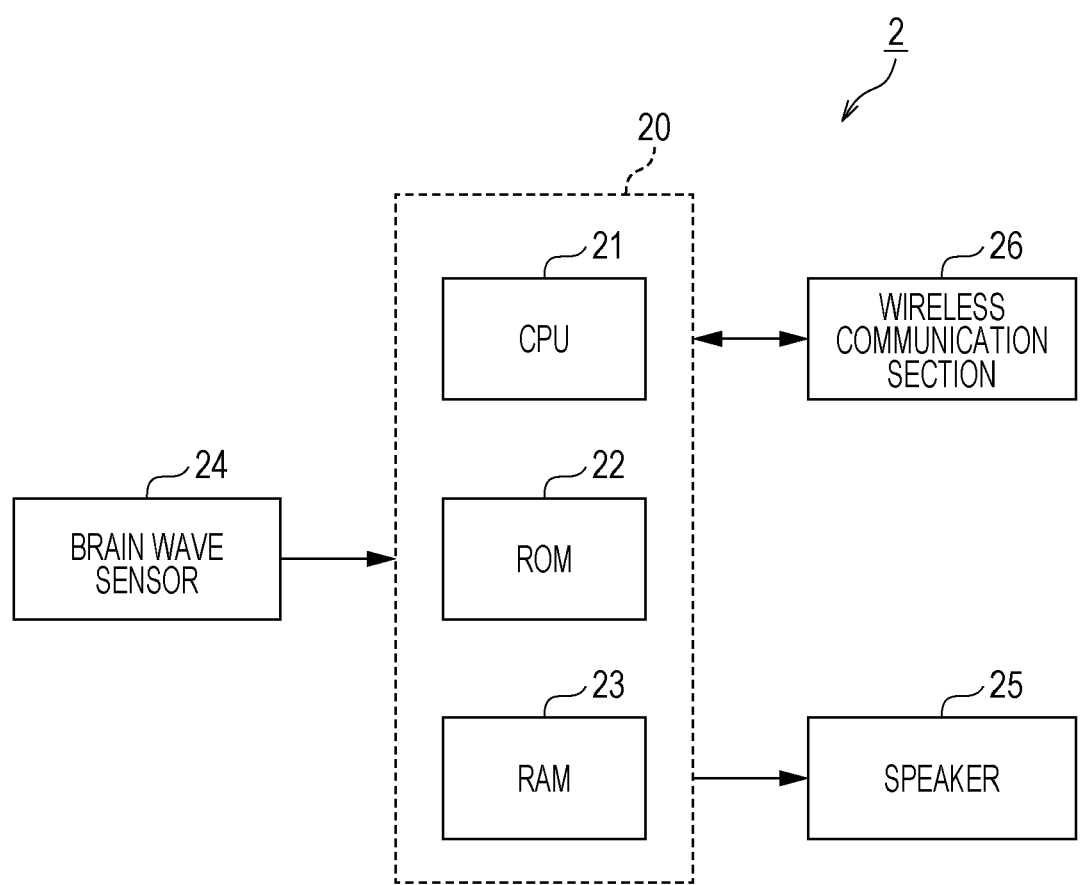
FIG. 2 illustrates an example of the hardware configuration of a hearable device.

Next, the hardware configuration of the hearable device 2 will be described. FIG. 2 illustrates an example of the hardware configuration of the hearable device 2. As illustrated in the drawing, the hearable device 2 includes a central processing unit (CPU) 21, a read only memory (ROM) 22, a random access memory (RAM) 23, a brain wave sensor a speaker 25, and a wireless communication section 26.

The CPU 21 controls the entire hearable device 2 through execution of a program (including basic software).

The ROM 22 stores programs such as a basic input/output system (BIOS) and the basic software. The ROM 22 is constituted of a non-volatile semiconductor memory, data in which are electrically rewritable, for example.

The RAM 23 is used as an area for execution of the programs.

The CPU 21, the ROM 22, and the RAM 23 function as a computer 20. For example, the CPU 21 loads various programs etc. stored in the ROM 22 into the RAM 23 and executes the programs etc. to implement various functions of the hearable device 2.

The brain wave sensor 24, which is an example of the measurement unit, measures brain waves by detecting information on the potential of the brain waves of the user. For example, the brain wave sensor 24 is provided with a plurality of electrodes that detect the information on the potential of the brain waves. The electrodes are disposed at positions at which brain waves are easily measurable when the hearable device 2 is mounted to the user. Then, the brain wave sensor 24 measures brain waves by amplifying the potential difference between two electrodes, for example. It should be noted, however, that the method of measuring brain waves is not limited in the present embodiment, and a method according to the related art may be used.

Information on the brain waves measured by the brain wave sensor 24 is transmitted to the user terminal 3 via the wireless communication section 26. The information may be subjected to various processes performed by the CPU 21 such as a process of shaping the waveform by removing noise contained in a brain wave signal and a process of further amplifying the brain wave signal, for example, before the information is transmitted to the user terminal 3.

The speaker 25, which is an example of the output unit, outputs music to the user on the basis of data on music received from the user terminal 3. In the case where the music is corrected when brain waves are measured, the speaker 25 outputs the corrected music to the user.

The wireless communication section 26 includes an antenna for wireless communication, and functions as an interface for external wireless communication. For example, the wireless communication section 26 transmits information on brain waves measured by the brain wave sensor 24 to the user terminal 3, and receives data on music from the user terminal 3. Bluetooth, for example, is used in the wireless communication as discussed above.

<Hardware Configuration of User Terminal>

Figure 3:
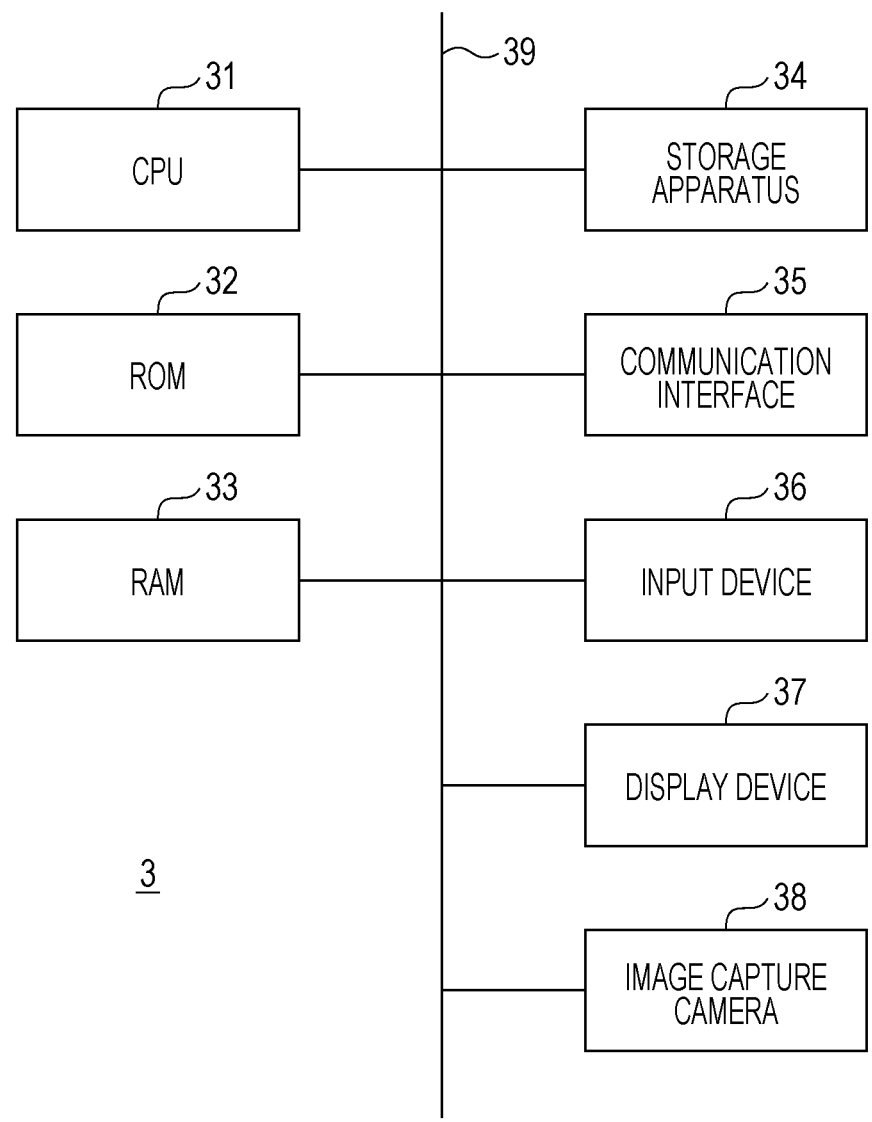
FIG. 3 illustrates an example of the hardware configuration of a user terminal.

Next, the hardware configuration of the user terminal 3 will be described. FIG. 3 illustrates an example of the hardware configuration of the user terminal 3.

The user terminal 3 includes a CPU 31 that provides various functions through execution of firmware or an application program, a ROM 32 that serves as an area for storage of firmware or a BIOS, and a RAM 33 that serves as an area for execution of a program.

The user terminal 3 also includes a non-volatile storage apparatus 34 that stores a downloaded application program, information on the brain waves of the user received from the hearable device 2, data on music to be transmitted to the hearable device 2, etc., a communication interface 35 that is used for external communication, an input device 36 such as a touch screen, a display device 37 that includes a display or the like that is used to display information, and an image capture camera 38. A semiconductor memory, for example, is used as the storage apparatus 34.

The CPU 31 and the various devices are connected to each other through a bus 39, <Functional Configuration of Computer of Hearable Device>

Figure 4:
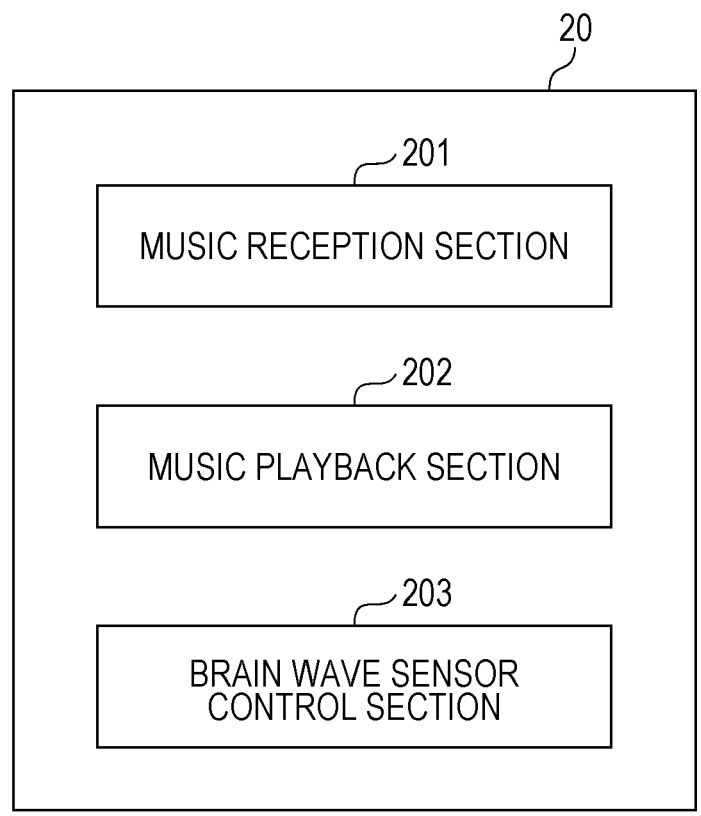
FIG. 4 is a block diagram illustrating an example of the functional configuration of a computer of the hearable device.

Next, the functional configuration of the computer 20 of the hearable device 2 will be described. FIG. 4 is a block diagram illustrating an example of the functional configuration of the computer 20 of the hearable device 2. As illustrated in the drawing, the computer 20 of the bearable device 2 includes a music reception section 1, a music playback section 202, and a brain wave sensor control section 203.

The music reception section 201 receives data on music from the user terminal 3 via the wireless communication section 26 (see FIG. 2). In the case where the music is corrected, the music reception section 201 receives data on the corrected music.

The music playback section 202 plays back music on the basis of the data on music received by the music reception section 201. The music which is played back is output from the speaker 25 (see FIG. 2) to the user.

The brain wave sensor control section 203 controls operation of the brain wave sensor 24. The brain wave sensor control section 203 controls the brain wave sensor 24 so as to start and finish measurement of brain waves. In addition, the brain wave sensor control section 203 transmits information on the brain waves measured by the brain wave sensor 24 to the user terminal 3 via the wireless communication section 26.

The functional sections constituting the bearable device 2 illustrated in FIG. 4 are implemented through cooperation between software and hardware resources. Specifically, in the case where the bearable device 2 is implemented by the hardware configuration illustrated in FIG. 2, for example, the functional sections such as the music reception section 201, the music playback section 202, and the brain wave sensor control section 203 are implemented with the programs etc. stored in the ROM 22 or the like read into the RAM 23 and executed by the CPU 21.

<Functional Configuration of User Terminal>

Figure 5:
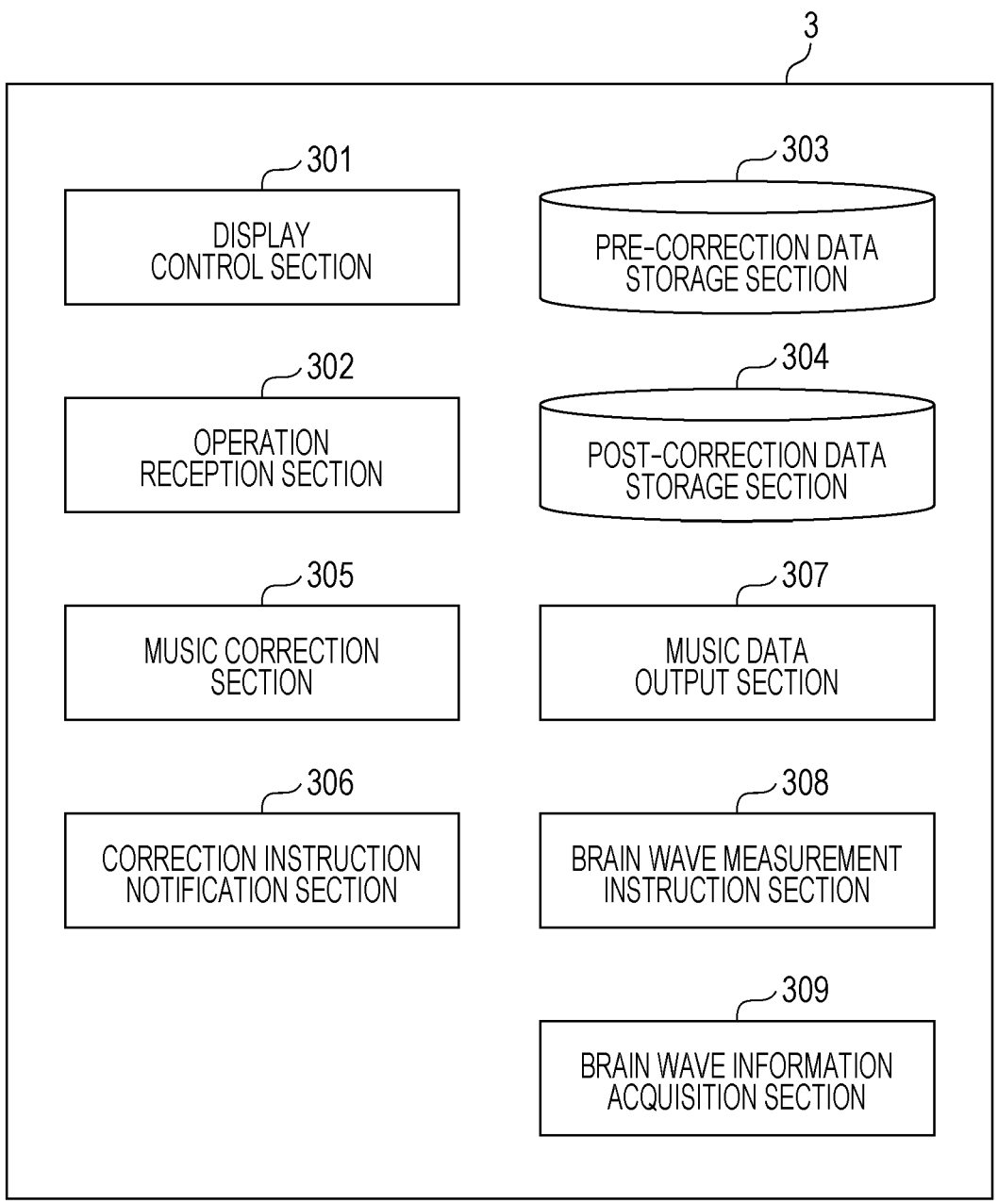
FIG. 5 is a block diagram illustrating an example of the functional configuration of the user terminal.

Next, the functional configuration of the user terminal 3 will be described. FIG. 5 is a block diagram illustrating an example of the functional configuration of the user terminal 3. As illustrated in the drawing, the user terminal 3 includes a display control section 301, an operation reception section 302, a pre-correction data storage section 303, a post-correction data storage section 304, a music correction section 305, a correction instruction notification section 306, a music data output section 307, a brain wave measurement instruction section 308, and a brain wave information acquisition section 309.

The display control section 301 controls display on the display device 37 by generating a control signal for controlling display on the display device 37.

The operation reception section 302, which is an example of the reception unit, receives an operation from the user. The operation reception section 302 receives an operation to select a desired state such as a concentrating state on the screen displayed on the display or the like of the display device 37, for example. The operation reception section 302 also receives an operation to command correction of music, for example.

The pre-correction data storage section 303 stores data on music to be transmitted to the bearable device 2. The data on music to be stored in the pre-correction data storage section 303 are data on music before being corrected (that has not been corrected).

The post-correction data storage section 304, which is an example of the saving unit, stores data on post-correction music. The data on music to be stored in the post-correction data storage section 304 are data obtained by the music correction section 305 correcting the data on music stored in the pre-correction data storage section 303. Once music is corrected and data on the corrected music are stored in the post-correction data storage section 304, the data stored in the post-correction data storage section 304 are used in the case where the music is corrected the next time.

The music correction section 305 corrects music to be output from the speaker 25 of the hearable device 2 in the case where a setting for correcting music has been made. The setting for correcting music is made by receiving an operation to command correction of music from the user, for example. The setting for correcting music may be made as an initial setting of the user terminal 3. In this case, it may be understood that a command to correct music has been received at the stage of initial setting.

Correction of music is a process performed such that measurement of brain waves is not affected, that is, a process performed to reduce the effect of music on brain waves. More specifically, correction of music is a process performed such that the speaker 25 does not output music at a frequency that is equal to or less than (or that is less than) a frequency determined in advance. In other words, correction of music is a process in which music at a frequency in the same band as the frequency band of brain waves is not output so that the frequency of music to be output from the speaker 25 does not overlap the frequency of brain waves. In the following, the frequency determined in advance here is occasionally referred to as a "designated frequency".

In general, in the case where focus is placed on the frequency of brain waves, brain waves are classified into five types, namely γ-waves, β-waves, α-waves, θ-waves, and δ-waves.

The γ-waves have a waveform with a frequency of 30 to 80 hertz (Hz), and are considered to appear when a person is feeling significantly anxious or excited.

The β-waves have a waveform with a frequency of 30 to 13 hertz, and are considered to appear when a person feeling tense or stressed.

The α-waves have a waveform with a frequency of 13 to 8 hertz, and are considered to appear when a person is feeling calm (relaxed) or keeps his/her eyes closed.

The θ-waves have a waveform with a frequency of 8 to 4 hertz, and are considered to appear when a person is deeply relaxed or asleep.

The δ-waves have a waveform with a frequency of less than 4 hertz, and are considered to appear when a person is sound asleep or in a coma.

Thus, the designated frequency is determined as 80 hertz which is the maximum value of the frequency of the common brain waves discussed above, for example, and a process is performed such that the speaker 25 does not output music at a frequency of 80 hertz or less.

More specifically, the music correction section 305 performs a process of deleting (cutting) data on music at a frequency of 80 hertz or less from the data on music stored n the pre-correction data storage section 303, for example. Through this process, music (i.e. music, at a frequency of higher than 80 hertz) from which music at a frequency of 80 hertz or less has been deleted is transmitted to the hearable device 2, and output from the speaker 25.

In addition, data on post-correction music which has been corrected by the music correction section 305 are stored in the post-correction data storage section 304.

The correction instruction notification section 306 prompts the user to command correction of music in the case where music to be output from the speaker 25 of the hearable device 2, that is, music to be transmitted from the user terminal 3 to the bearable device 2, meets a condition determined in advance.

For example, the correction instruction notification section 306 prompts the user to command correction of music it the case where the number of times when the frequency of music to be transmitted from the user terminal 3 to the hearable device 2 becomes equal to or less than the frequency determined in advance reaches a threshold. Alternatively, the correction instruction notification section 306 prompts the user to command correction of music in the case where the time for which music at a frequency that is equal to or less than the frequency determined in advance is output from the speaker 25 of the hearable device 2, that is, the time for which music at a frequency that is equal to or less than the frequency determined in advance is transmitted from the user terminal 3 to the hearable device 2, reaches a threshold, for example.

The frequency determined in advance here is not a frequency for application to correction of music, but is a frequency for notifying the user. Therefore, the frequency determined in advance may be the same as or different from the designated frequency discussed above. For example, the frequency determined in advance may be set to a value of a frequency of higher than the designated frequency.

Examples of the method of prompting the user to command correction of music include outputting a warning sound from the speaker 25. In this case, the correction instruction notification section 306 commands the hearable device 2 to output a warning sound when music to be transmitted to the hearable device 2 meets the condition determined in advance. Then, a warning sound is output from the speaker 25. In addition, a message or a screen may be displayed on the display of the user terminal 3, for example. In this case, the correction instruction notification section 306 commands the display control section 301 to display a message that prompts the user to command correction of music when music to be transmitted to the hearable device 2 meets the condition determined in advance. Then, the display control section 301 displays a message on the display.

The music data output section 307 transmits data on music to the hearable device 2. In the case where music is not corrected, the music data output section 307 transmits data on music stored in the pre-correction data storage section 303 to the hearable device 2.

In the case where music is corrected, on the other hand, the music data output section 307 transmits data on post correction music, which are obtained by the music correction section 305 correcting data on music stored in the pre-correction data storage section 303, to the bearable device 2.

In the case where music, which has been corrected once and the data on which have been stored in the post-correction data storage section 304, is corrected again, the music data output section 307 transmits data on music stored in the post-correction data storage section 304 to the hearable device 2.

The brain wave measurement instruction section 308 commands the hearable device 2 to measure the brain waves of the user. The brain wave measurement instruction section 308 commands the hearable device 2 to measure the brain waves of the user in the case where the operation reception section 302 receives an operation to select a desired state such as a concentrating state, for example.

The brain wave information acquisition section 309 acquires information on the brain waves of the user measured by the hearable device 2 from the hearable device 2.

The functional sections constituting the user terminal 3 illustrated in FIG. 5 are implemented through cooperation between software and hardware resources. Specifically, in the case where the user terminal 3 is implemented by the hardware configuration illustrated in FIG. 3, for example, the functional sections such as the display control section 301, the operation reception section 302, the music correction section 305, the correction instruction notification section 306, the music data output section 307, the brain wave measurement instruction section 308, and the brain wave information acquisition section 309 are implemented with the programs etc. stored in the ROM 32, the storage apparatus 34, or the like read into the RAM 33 and executed by the CPU 31. In addition, the pre-correction data storage section 303 and the post-correction data storage section 304 are implemented by the storage apparatus 34, for example.

<Procedure of Process Performed by User Terminal>

Figure 6A:
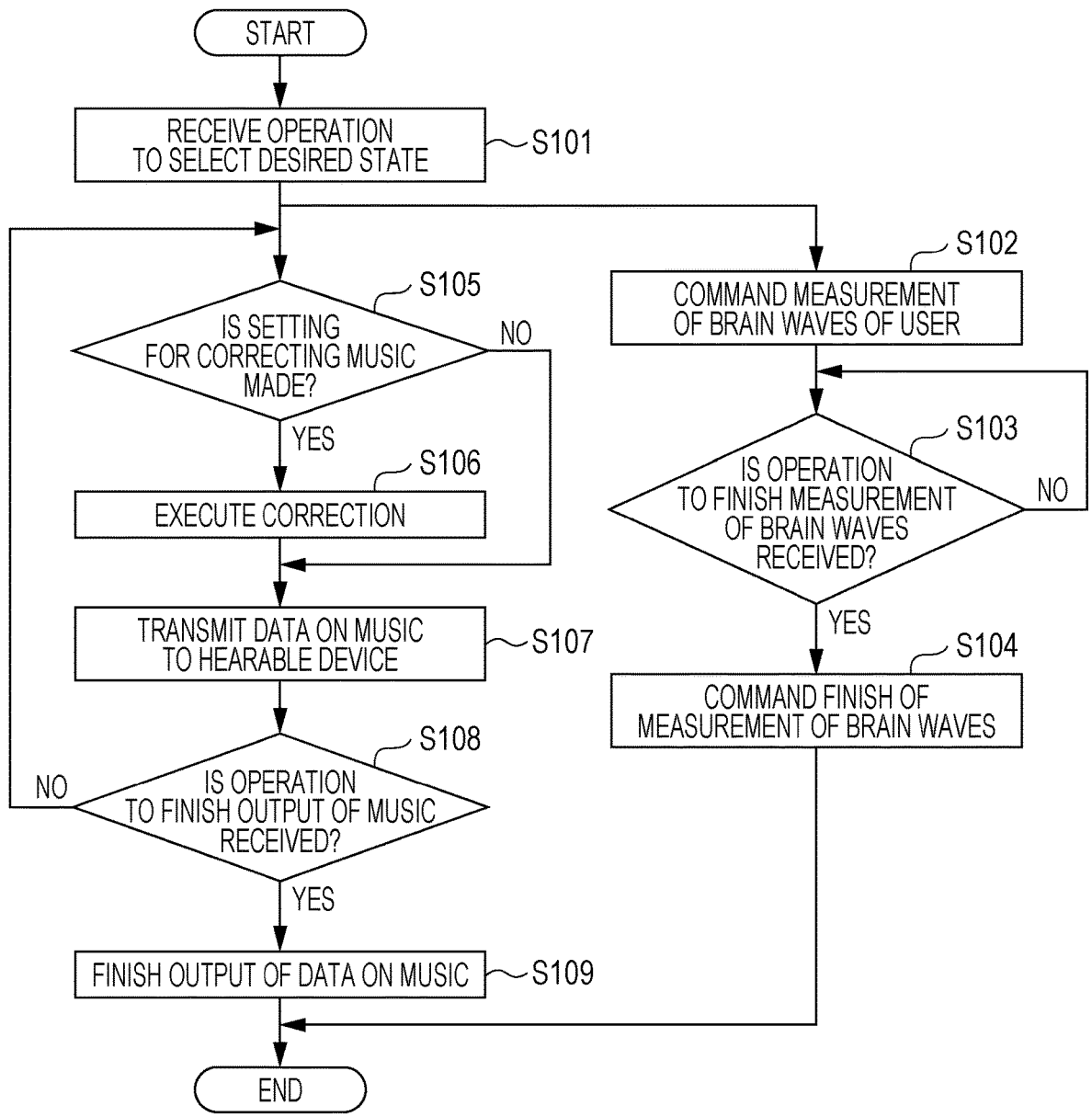
FIG. 6A is a flowchart illustrating an example of the procedure of a process performed by the user terminal.

Next, the procedure of a process performed by the user terminal 3 will be described. FIGS. 6A and 6B are each a flowchart illustrating an example of the procedure of a process performed by the user terminal 3.

First, when the user selects a desired state, the operation reception section 302 of the user terminal 3 receives an operation to select the desired state (step 101). It is assumed that the user selects a "concentrating state" in this example.

The brain wave measurement instruction section 308 commands the hearable device 2 to measure the brain waves of the user (step 102). In response to this command, the hearable device 2 starts measurement of the brain waves. Next, the brain wave measurement instruction section 308 determines whether or not the operation reception section 302 receives an operation to finish measurement of the brain waves (step 103).

In the case where a negative determination (NO) is made in step 103, the bearable device continuously performs measurement of the brain waves.

In the case where an affirmative determination made in step 103, on the other hand, the brain wave measurement instruction section 308 commands the hearable device 2 to finish measurement of the brain waves (step 104). In response to this command, the hearable device 2 finishes measurement of the brain waves.

After step 101, a process related to playback of music is performed concurrently with the processes in steps 102 to 104 related to measurement of the brain waves.

After step 101, the music correction section 305 determines whether or not a setting for correcting music has been made (step 105).

In the case where an affirmative determination (YES) is made in step 105, the music correction section 305 executes correction of data on music stored in the pre-correction data storage section 303 (step 106). In this example, the music correction section 305 acquires music that brings the user to a concentrating state from the pre-correction data storage section 30:3, and executes correction of the acquired music.

In the case where a negative determination (NO) is made in step 105, on the other hand, the music correction section 305 does not correct the music.

Next, the music data output section 307 transmits data on the music to the hearable device 2 (step 107). As a consequence of this process, music is output from the speaker 25 of the hearable device 2 to the user. In the case where music is corrected in step 106, the music data output section 307 transmits data on the post-correction music to the hearable device 2. In the case where is not corrected, on the other hand, the music data output section 307 acquires data on music stored in the pre-correction data storage section 303, and transmits the acquired data on music to the hearable device 2. In this example, the music data output section 307 acquires music that brings the user to a concentrating state from the pre-correction data storage section 303, and transmits data on the acquired music to the hearable device 2.

Next, the music data output section 307 determines whether or not the operation reception section 302 receives an operation to finish output of music (step 108). The operation here may be the same as or different from the operation to finish measurement of the brain waves in step 103.

In the case where a negative determination (NO) is made in step 108, the process proceeds to step 105. For example, when the user performs an operation to command correction of music in the case where music that has not been corrected is output to the user, an affirmative determination (YES) is made in step 105. In this case, corrected music is output to the user in the middle and onward.

In the case where an affirmative determination (YES) is made in step 108, on the other hand, the music data output section 307 finishes output of data on music (step 109). Therefore, the hearable device 2 also finishes output of music. The process flow is ended.

Meanwhile, the process procedure illustrated in FIG. 6B is a procedure that prompts the user to command correction of music in the case where music to be transmitted to the hearable device 2 (i.e. music to be output from the speaker 25 of the hearable device 2) meets a condition determined in advance. This process is performed after step 101 indicated in FIG. 6A until output of data on music is finished in step 109, concurrently with the processes in steps 102 to 108. In this example, a warning sound is output from the speaker 25 as a method of prompting the user.

After step 101 indicated in FIG. 6A, the correction instruction notification section 306 determines whether or not a setting for correcting music has been made (step 201). In the case where an affirmative de termination (YES) is made in step 201, the process flow is ended. In the case where a negative determination (NO) is made in step 201, on the other hand, the correction instruction notification section 306 determines whether or not the music to be transmitted to the hearable device 2 meets the condition determined in advance (step 202).

In the case where a negative determination (NO) is made in step 202, the determination in step 202 is continuously made. In the case where an affirmative determination (YES) is made in step 202, on the other hand, the correction instruction notification section 306 commands the hearable device 2 to output a warning sound (step 203). In response to this command, the hearable device 2 outputs a warning sound to the user.

Next, the correction instruction notification section 306 determines whether or not the operation reception section 302 receives an operation to command correction of music (step 204). In the case where a negative determination (NO) is made in step 204, the hearable device 2 continuously outputs a warning sound. In the case where an affirmative determination (YES) is made in step 204, on the other hand, the correction instruction notification section 306 commands the hearable device 2 to finish output of the warning sound (step 205). In response to this command, the hearable device 2 stops the warning sound. The process flow ended.

<Procedure of Process Performed by Hearable Device>

Figure 7:
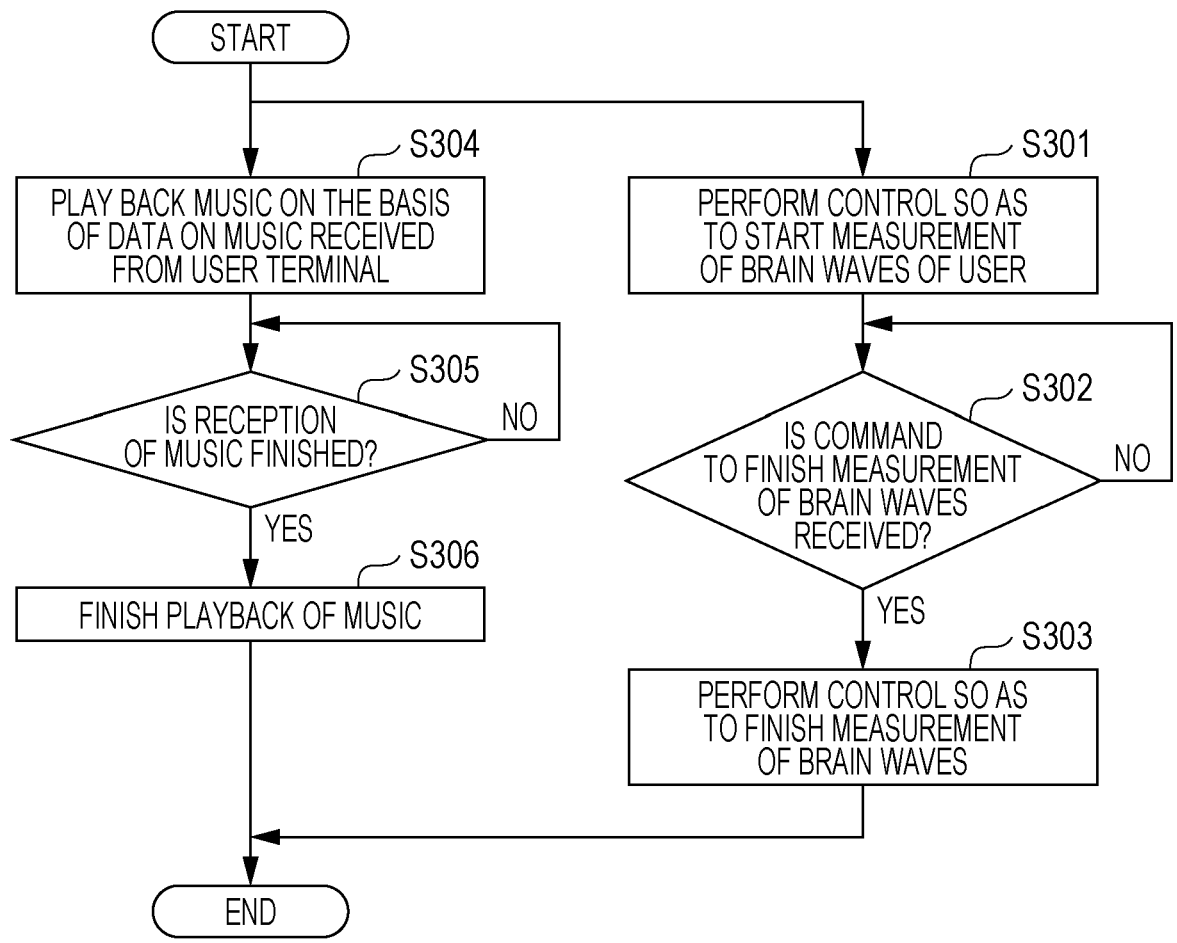
FIG. 7 is a flowchart illustrating an example of the procedure of a process performed by the hearable device.

Next, the procedure of a process performed by the hearable device 2 will be described. FIG. 7 is a flowchart illustrating an example of the procedure of a process performed by the hearable device 2.

First, when a command to measure brain waves is received from the user terminal 3, the brain wave sensor control section. 203 controls the brain wave sensor 24 so as to start measurement of the brain waves of the user (step 301). Next, the brain wave sensor control section 203 determines whether or not a command to finish measurement of the brain waves is received from the user terminal 3 (step 302). In the case where a negative determination (NO) is made in step 302, measurement of the brain waves is continuously performed. In the case where an affirmative determination (YES) is made in step on the other hand, the brain wave sensor control section 203 controls the brain wave sensor 24 so as to finish measurement of the brain waves (step 303).

When measurement of the brain waves is finished, the brain wave sensor control section 203 transmits information on the brain waves measured by the brain wave sensor 24 to the user terminal 3. It should be noted, however, that the brain wave sensor control section 203 may transmit information on the measured brain waves concurrently with the brain wave sensor 24 measuring the brain waves.

A process related to playback of music is performed concurrently with the processes in steps 301 to 303 related to measurement of the brain waves.

The music playback section 202 plays back music on the basis of the data on music received from the user terminal 3 by the music reception section 201 (step 304). The music which is played back is output from the speaker 25 to the user. Next, the music playback section 202 determines whether or not reception of music by the music reception section 201 is finished (step 305). In the case where a negative determination (NO) is made in step 305, the music is continuously played back. In the case where an affirmative determination (YES) made in step 305, on the other hand, the music playback section 202 finishes playback of the music (step 306). The process flow is ended.

Specific Example of Process Performed by Brain Wave Measurement System

Next, the process performed by the brain wave measurement system 1 will be described with reference to a specific example.

Figure 8B:
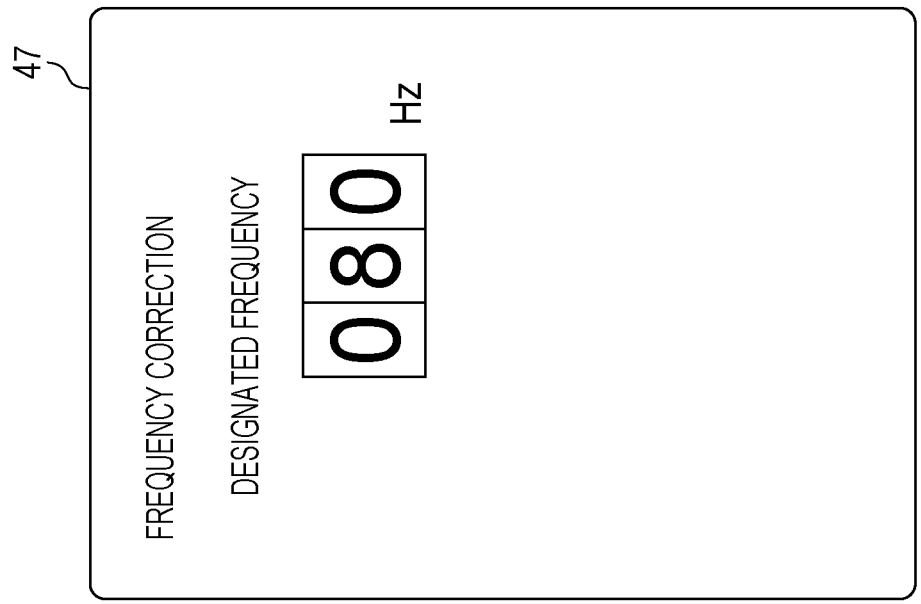
FIGS. 8A and 8E each illustrate an example of a screen displayed on a display of the user terminal.
Figure 8A:
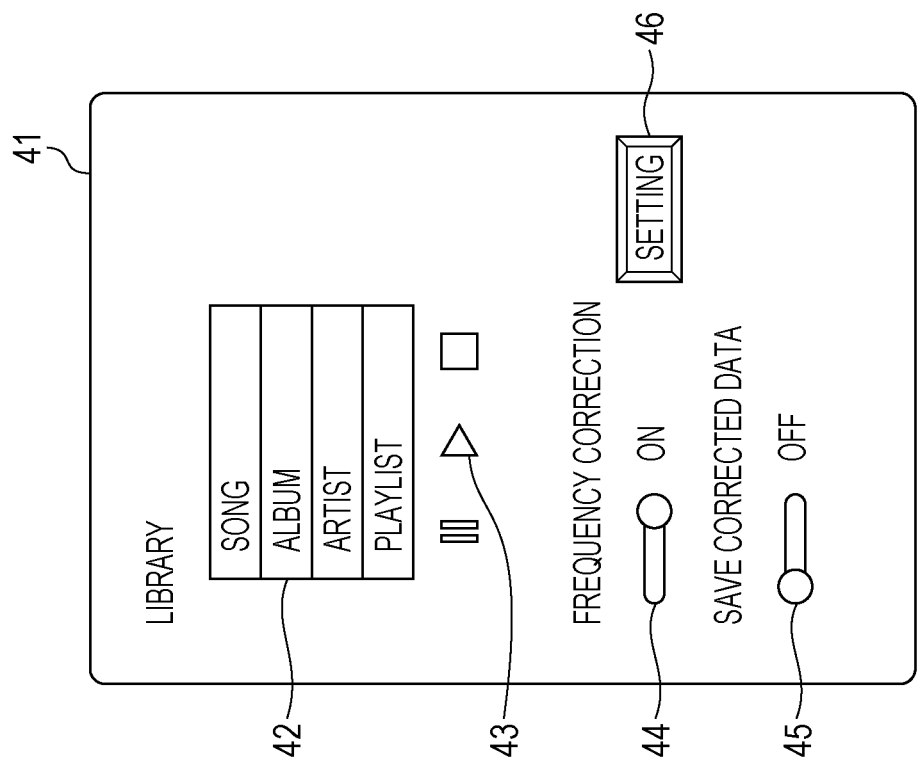

FIGS. 8A and 8B each illustrate an example of a screen displayed on the display of the user terminal 3. FIG. 8A illustrates a home screen 41. The home screen 41 is provided with various items for use to play back music. For example, when "song" in an item 42 is selected after the user selects a desired state, a list of songs that bring the user to the desired state, among songs stored in the pre-correction data storage section 303, is displayed. Then, when the user selects a song from the list of songs and further selects a playback button 43, for example, data on the selected song are transmitted to the bearable device 2. Then, the selected song is output from the speaker 25 to the user.

In the case where a frequency correction button 44 is set to ON as illustrated in FIG. 8A, the music correction section 305 acquires data on the song selected by the user from the pre-correction data storage section 303, and corrects data on the acquired song. Then, the corrected data on the song are transmitted to the bearable device 2.

In the case where the frequency correction button 44 is set to OFF, on the other hand, the music correction section acquires data on the song selected by the user from the pre-correction data storage section 303, and the acquired data on the song are transmitted to the hearable device 2 without being corrected.

Setting of the frequency correction button 44 is switchable between ON and OFF by the user operating the frequency correction button 44 before or during output of music, for example. In addition, the frequency correction button 44 may be set to ON in the initial setting. In this case, it is considered that a command to correct music has been received at the stage of initial setting.

In the case where a corrected data save button 45 is set to OFF as illustrated in FIG. 8A, meanwhile, data after being corrected by the music correction section 305 are not stored in the post-correction data storage section 304. In the case where the corrected data save button 45 is set to ON, on the other hand, data after being corrected by the music correction section 305 are stored in the post-correction data storage section 304.

Setting of the corrected data save button 45 is switchable between ON and OFF by the user operating the corrected data save button 45.

When the user further operates a setting button 46 for frequency correction, a correction setting screen 47 that receives various settings for correction of music is displayed. As illustrated in FIG. 8B, the designated frequency is set on the correction setting screen 47. The value of the designated frequency is changeable on the screen. In this example, the value of the designated frequency is set to 80 hertz.

FIG. 9 illustrates an example of correction of music. The example illustrated in FIG. 9 indicates that data on music at a frequency of 80 hertz or less are deleted in the case where the designated frequency is set to 80 hertz.

More specifically, the case where the frequency correction button 44 is set to OFF, music at 20 hertz to 20000 hertz (twenty kilohertz) is output from the speaker 25, for example. In the case where the frequency correction button 44 is set to ON, on the other hand, correction is performed to delete data on music at a frequency of 80 hertz or less. As a result, music at higher than 80 hertz and 20000 hertz or less is output from the speaker 25.

Next, a case where the correction instruction notification section 306 prompts the user will be described.

In the case where the frequency correction button 44 is set to OFF, the correction instruction notification section 306 prompts the user to command correction of music when music transmitted to the bearable device 2 (i.e., music to be output from the speaker 25) meets a condition determined in advance. In other words, the correction instruction notification section 306 prompts the user to set the frequency correction button 44 to ON.

Figure 10A:
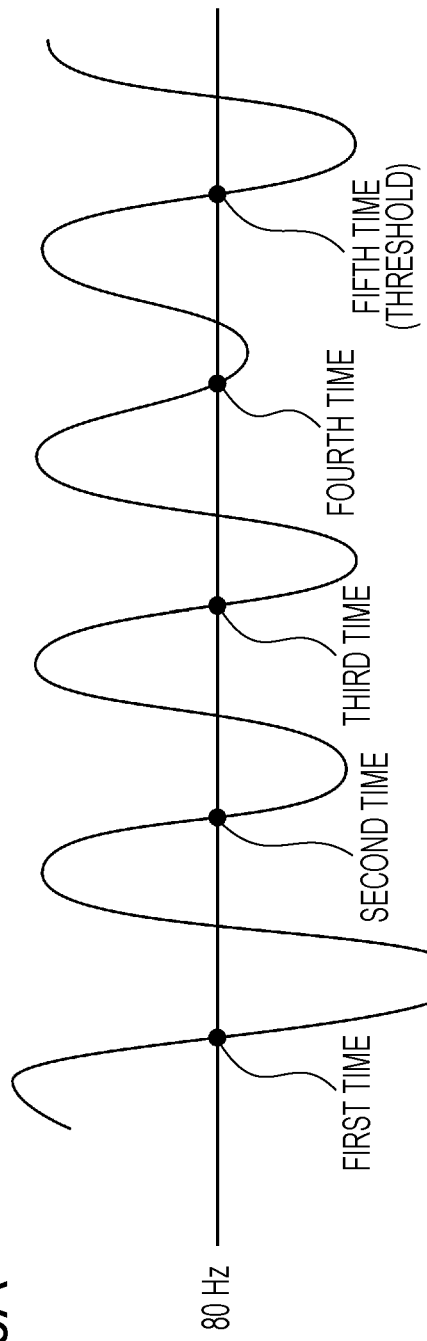
FIGS. 10A and 10B illustrate an example of a case where music to be transmitted to the hearable device meets a condition determined in advance.
Figure 10B:
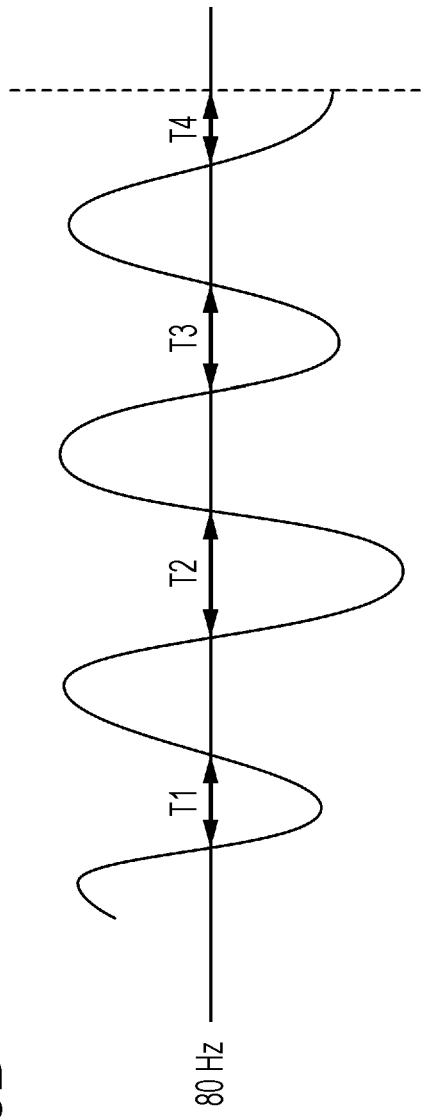

FIGS. 10A and 10B illustrate an example of a case where music to be transmitted to the hearable device 2 meets a condition determined in advance.

In the example illustrated in FIG. 10A, the user is prompted to command correction of music in the case where the number of times when the frequency of music to be transmitted to the hearable device 2 becomes equal to or less than the frequency determined in advance reaches a threshold. In this example, the threshold is "five times". In addition, the frequency determined in advance is 80 hertz, which is the same as the designated frequency. That is, the correction instruction notification section 306 prompts the user to command correction of music in the case where the number of times when the frequency of music to be transmitted to the hearable device 2 becomes equal to or less than 80 hertz reaches five.

In the example illustrated in FIG. 10B, meanwhile, the user is prompted to command correction of music in the case where the time for which music at a frequency that is equal to or less than the frequency determined in advance is transmitted to the hearable device 2 reaches a threshold. In this example, the threshold is "ten seconds". In addition, the frequency determined in advance is 80 hertz as in FIG. 10A. That is, the correction instruction notification section 306 prompts the user to command correction of music in the case where the time for which music at a frequency of 80 hertz or less is transmitted to the hearable device 2, more specifically, the total of T1, T2, T3, and T4, reaches ten seconds.

When the user sets the frequency correction button 44 to ON after the correction instruction notification section 306 prompts the user to command correction of music, the process of prompting the user is ended. For example, a warning sound from the speaker 25 is stopped, or a message or a screen displayed on the display of the user terminal 3 is erased or turned off.

It is conceivable that the user would like to listen to music with high sound quality even in the case where brain waves are measured. Thus, the user terminal 3 may receive a command not to correct music.

Figure 11:
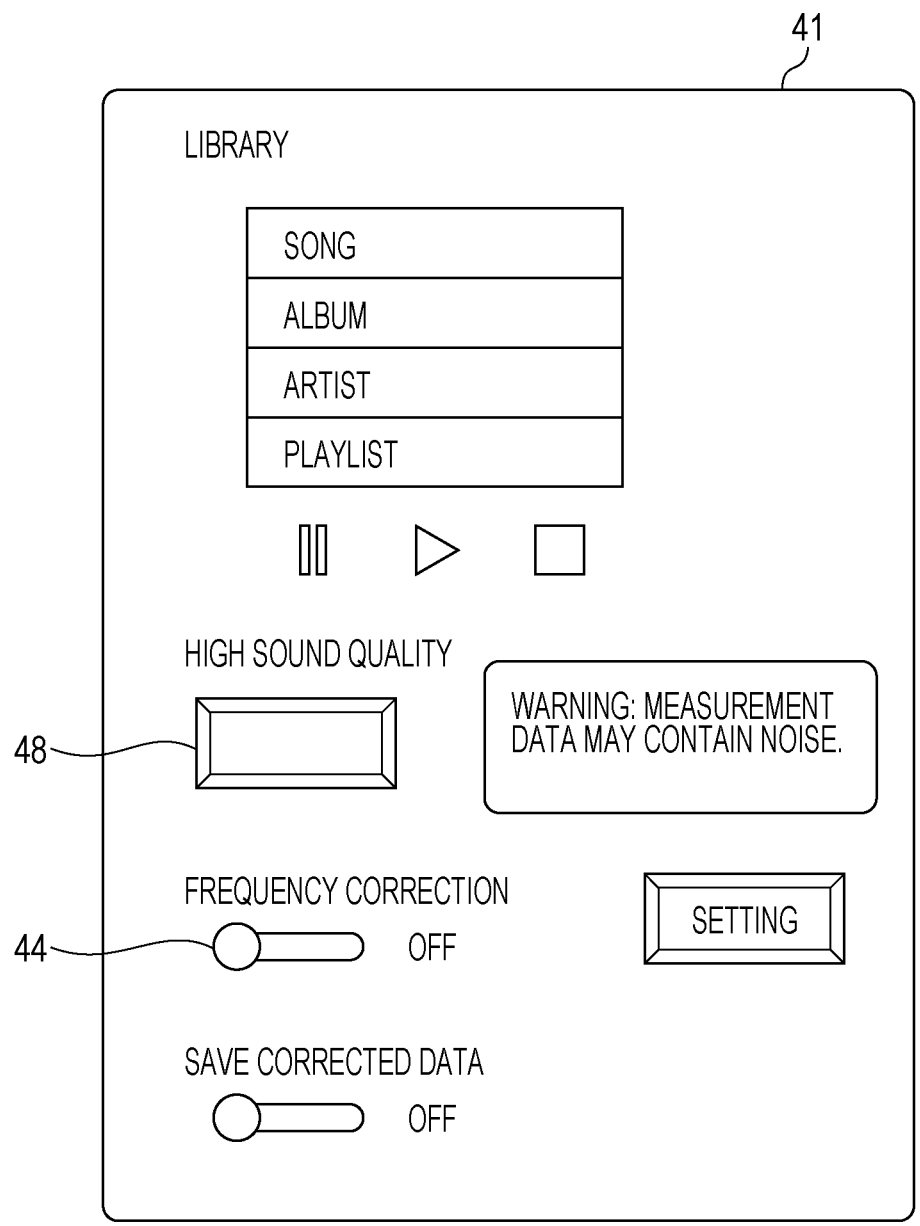
FIG. 11 illustrates an example of a home screen for a case where high-sound-quality button is provided.

FIG. 11 illustrates an example of the home screen 41 for a case where a high-sound-quality button 48 is provided. As described in relation to FIGS. 10A and 10B, the correction instruction notification section 306 prompts the user to command correction of music in the case where the number of times when the frequency of music to be transmitted to the bearable device 2 becomes equal to or less than the frequency determined in advance reaches a threshold or in the case where the time for which music at a frequency that is equal to or less than the frequency determined in advance is transmitted to the bearable device 2 reaches a threshold. The user may set the frequency correction button 44 to ON, or may operate the high-sound-quality button 48. When the user operates the high-sound-quality button 48, data on music are transmitted to the bearable device 2 without correction performed by the music correction section 305.

A warning message is displayed near the high-sound-quality button 48. This message gives a warning that the frequency of music to be output from the hearable device 2 overlaps the frequency of brain waves. In the example illustrated in FIG. 11, a message saying, "Measurement data may contain noise." is displayed. This message may be displayed at all times, but may be displayed when the user is prompted to command correction of music or when the user operates the high-sound-quality button 48, for example.

When the user operates the high-sound-quality button 48 after the correction instruction notification section 306 prompts the user to command correction of music, the process of prompting the user ended as in the case where the user sets the frequency correction button 44 to ON. More specifically, for example, a warning sound from the speaker 25 is stopped, or a message or a screen displayed on the display of the user terminal 3 is erased or turned off.

Figure 12:
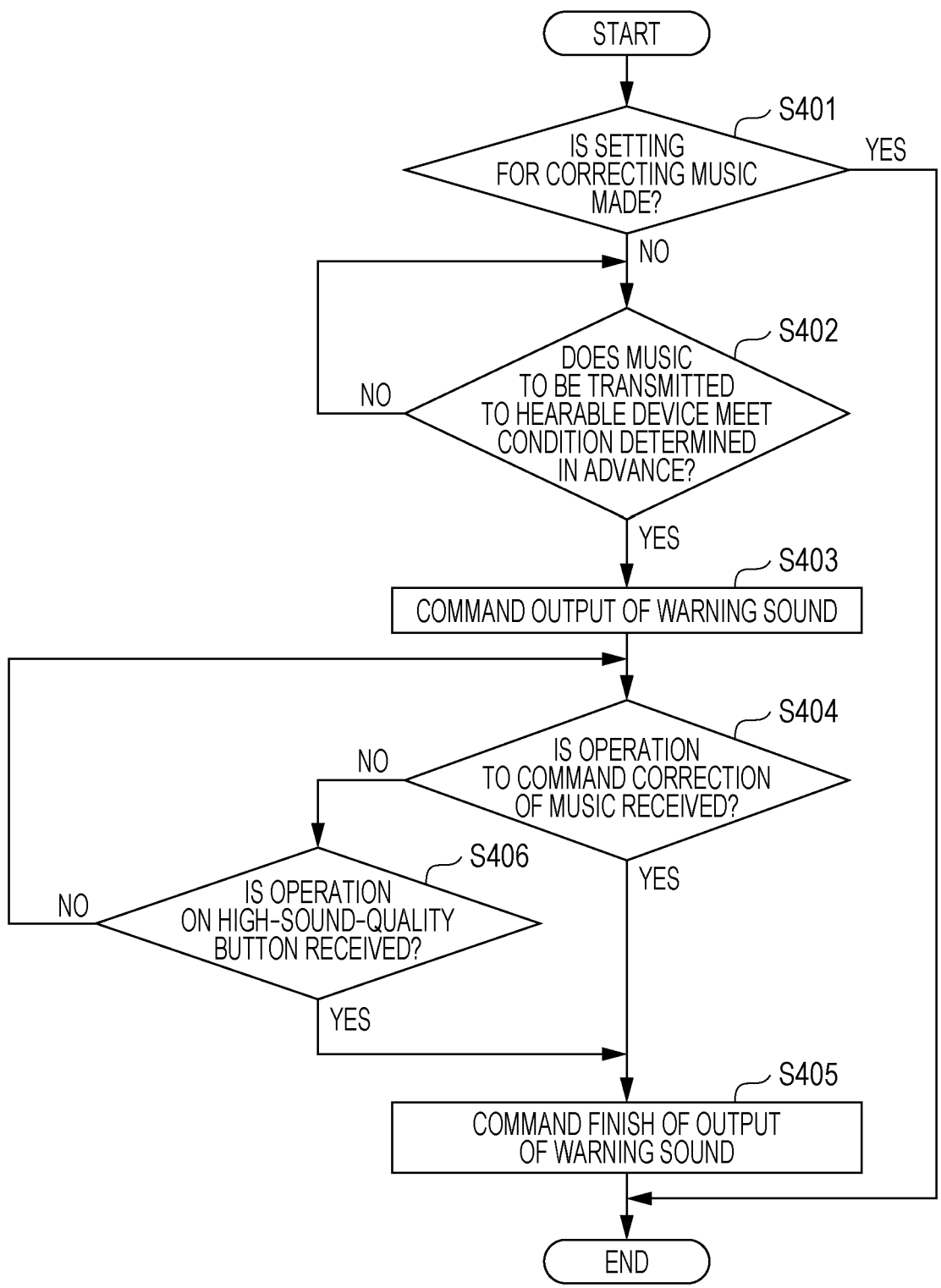
FIG. 12 is a flowchart illustrating an example of the procedure of a process performed by the user terminal for the case where the high-sound-quality button is provided.

FIG. 12 is a flowchart illustrating an example of the procedure of a process performed by the user terminal 3 for the case where the high-sound-quality button 48 is, provided. As with the procedure illustrated in FIG. 6B, the procedure illustrated in FIG. 12 is performed after step 101 indicated in FIG. 6A until output of data on music is finished in step 109, concurrently with the processes in steps 102 to 108. In this example, a warning sound is output from the speaker 25 as a method of prompting the user.

After step 101 indicated in FIG. 6A, the process in step 401 is started. The processes in steps 401 to 403 are the same as the processes in steps 201 to 203, respectively, indicated in FIG. 6B, and therefore are not described here.

After commanding the hearable device 2 to output a warning sound in step 403, the correction instruction notification section 306 determines whether or not the operation reception section 302 receives an operation to command correction of music (step 404).

In the case where an affirmative determination (YES) is made in step 404, the correction instruction notification section 306 commands the hearable device 2 to finish output of the warning sound (step 405). In response to this command, the hearable device 2 stops the warning sound. In this case, in addition, the music which has been corrected is output from the hearable device 2. The process flow is ended.

In the case where a negative determination (NO) is made in step 404, on the other hand, the correction instruction notification section 306 determines whether or not the operation reception section 302 receives an operation on the high-sound-quality button 48 (step 406).

In the case where a negative determination (NO) is made in step 406, the hearable device 2 continuously outputs a warning sound. In the case where an affirmative determination (YES) is made in step 406, on the other hand, the process proceeds to step 405, and the correction instruction notification section 306 commands the bearable device 2 to finish output of the warning sound. In response to this command, the hearable device 2 stops the warning sound. In this case, in addition, the music which has not been corrected is output from the hearable device 2. The process flow is ended.

Further, in the case where music to be transmitted to the hearable device 2 meets a condition determined in advance, correction of music may be started automatically (i.e. without using an operation by the user as a trigger), rather than the correction instruction notification section 306 prompts the user to command correction of music. Examples of the condition determined in advance here include a case where the number of times when the frequency of music to be transmitted to the hearable device 2 becomes equal to or less than the designated frequency reaches a threshold and a case where the time for which music at a frequency that is equal to or less than the frequency determined in advance is transmitted to the hearable device 2 reaches a threshold.

FIGS. 13A and 13B each illustrate an example of a screen for a case where correction of music is started automatically. The home screen 41 illustrated in FIG. 13A, unlike that in FIG. 8A, is not provided with the frequency correction button 44. On the other hand, the correction setting screen 47 is provided with an automatic correction button 49 as illustrated in FIG. 13B. When the user sets the automatic correction button 49 to ON, the music correction section 305 starts correction in the case where music to be transmitted to the hearable device 2 meets a condition determined in advance.

Setting of the automatic correction button 49 is switchable between ON and OFF by the user operating the automatic correction button 49 before or during output of music, for example. In the case where the automatic correction button 49 is set to ON, it is considered that a command to correct music has been received. In the case where the automatic correction button 49 is set to OFF, meanwhile, the frequency correction button 44 may be displayed as in FIG. 8A to receive an operation to command correction of music.

Figure 14:
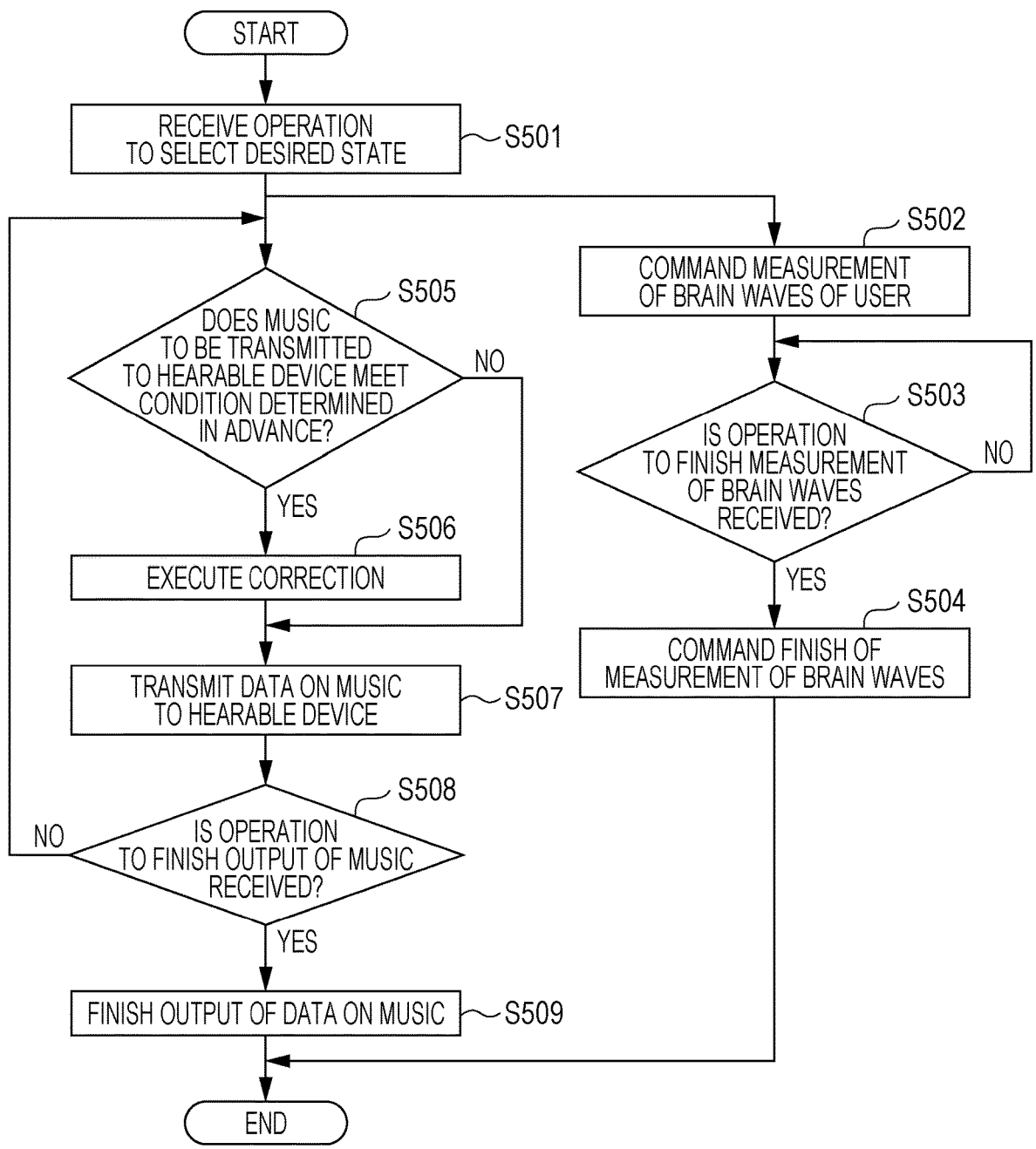
FIG. 14 is a flowchart illustrating an example of the procedure of a process performed by the user terminal for the case where correction of music is started automatically.

FIG. 14 is a flowchart illustrating an example of the procedure of a process performed by the user terminal 3 for the case where correction of music is started automatically. This process procedure is a procedure for a case where the automatic correction button 49 is set to ON.

First, the processes in steps 501 to 504 are the same as the processes in steps 101 to 104, respectively, indicated in FIG. 6A, and therefore are not described here.

After step 501, a process related to playback of music is performed concurrently with the processes in steps 502 to 504 related to measurement of the brain waves.

After step 501, the music correction section 305 determines whether or not the music to be transmitted to the hearable device 2 meets the condition determined in advance (step 505).

In the case where an affirmative determination (YES) is made in step 505, the music correction section 305 executes correction of data on music stored in the pre-correction data storage section 303 (step 506). In the case where a negative determination (NO) is made in step 505, on the other hand, the music correction section 305 does not correct the music.

The following processes in steps 507 to 509 are the same as the processes in steps 107 to 109, respectively, indicated in FIG. 6A, and therefore are not described here.

In this manner, correction performed by the music correction section 305 is started automatically.

Different Examples of Process for Correcting Music

Next, a different example of the process performed by the music correct on section 305 to correct music will be described. FIGS. 15A and 15B and FIGS. 16A and 16B each illustrate a different example of correction of music.

In the example illustrated in FIG. 9, a process of deleting data on music at a frequency that is equal to or less than the designated frequency is performed as the process performed such that the speaker 25 does not output music at a frequency that is equal to or less than the designated frequency. It should be noted, however, that the process performed such that the speaker 25 does not output music at a frequency that is equal to or less than the designated frequency is not limited to a process of deleting data on music.

For example, when data on music at a frequency that is equal to or less than the designated frequency are deleted, the user does not hear the deleted music, and may feel a sense of discomfort. Thus, in the example illustrated in FIG. 15, a process of compressing data on music at a frequency that is equal to or less than the designated frequency is performed as the process performed such that the speaker 25 does not output music at a frequency that is equal to or less than the designated frequency.

In the compression process, in the case where the designated frequency set to 80 hertz, for example, the music correction section 305 processes data on pre-correction music such that music in a frequency band of 80 hertz or less is compressed into a frequency band of higher than 80 hertz. As a consequence of this process, data on post-correction music are data in a frequency band of higher than 80 hertz. In the compression process, music at a frequency that is equal to or less than the designated frequency is compressed into a frequency band of higher than the designated frequency, and therefore music that is originally in a frequency band of higher than the designated frequency is also subjected to a change in frequency.

Figure 15A:
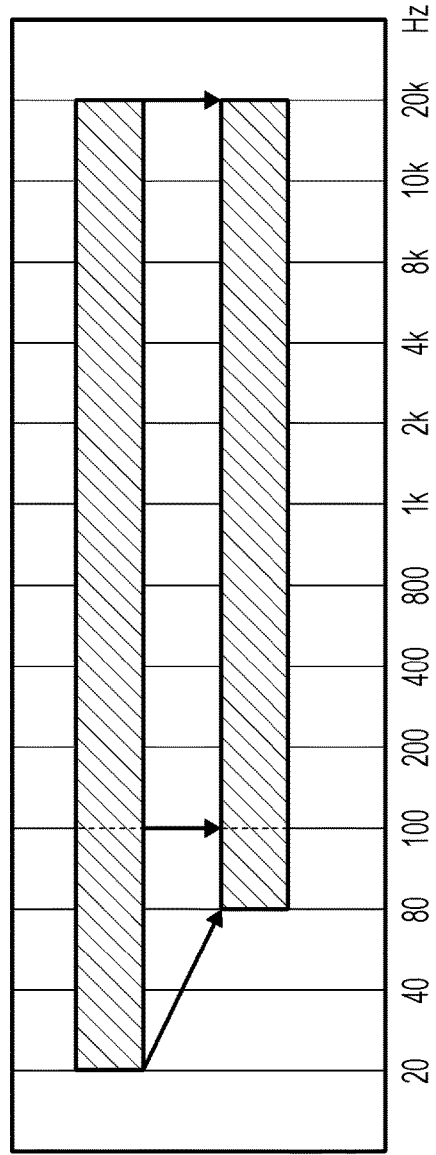
FIGS. 15A and 15B illustrate a different example of correction of music.

The example illustrated in FIG. 15A indicates a case where frequencies of 80 hertz or less are compressed into a frequency band of 80 hertz to 100 hertz in the case where the designated frequency is set to 80 hertz.

More specifically, in the case where the frequency correction button 44 is set to OFF, music at 20 hertz to 20000 hertz is output from the speaker 25. In the case where the frequency correction button 44 is set to ON, on the other hand, correction is performed to compress data on music at a frequency of 80 hertz or less are compressed into a frequency band in the range of 80 hertz to 100 hertz (range of higher than 80 hertz and equal to or less than 100 hertz).

In this case, it is necessary that, when music at 80 hertz or less is compressed into the range of 80 hertz to 100 hertz, music in the range of 80 hertz to 100 hertz before correction should become higher in the frequency than the music which has been compressed. Therefore, music in the range of 80 hertz to 100 hertz before correction is changed to be higher in the frequency for an amount corresponding to the music at 80 hertz or less which has been compressed. As a result, music at higher than 80 hertz and 20000 hertz or less is output from the speaker 25.

Figure 15B:
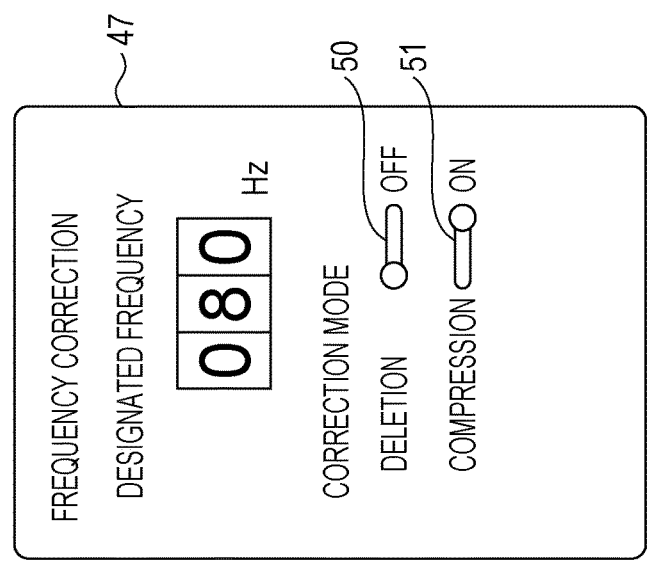

The music correction section 305 may support, as a mode of correcting music, only the deletion process in FIG. 9, only the compression process in FIGS. 15A and 15B, or both the deletion and compression processes.

In the case where both the processes are supported, the correction setting screen 47 allows selection of one of the deletion process and the compression process as illustrated in FIG. 15B, for example. In the example illustrated in FIG. 15B, the compression process is selected with a deletion mode button 50 set to OFF and with a compression mode button 51 set to ON. Setting of the deletion mode button 50 and the compression mode button 51 is switchable between ON and OFF in accordance with selection by the user, and one of the buttons is set to ON.

Figure 16A:
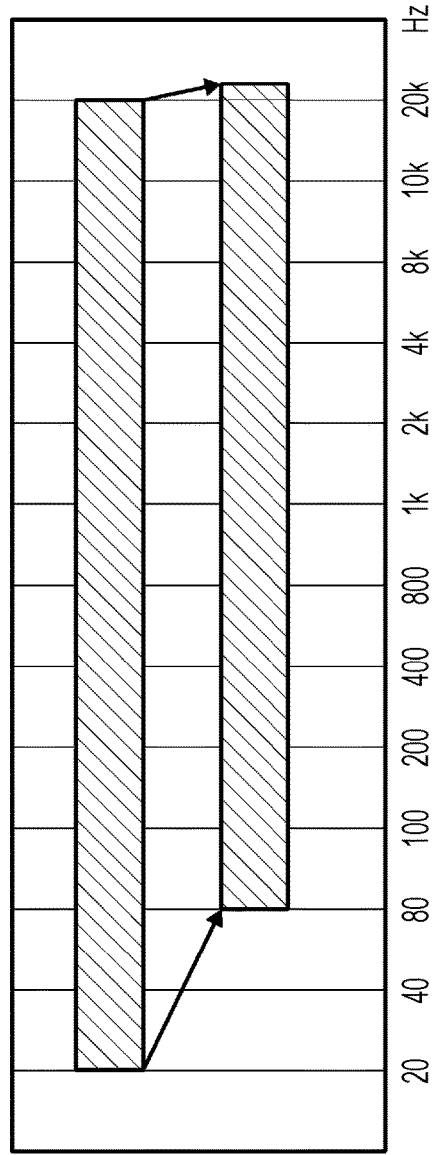
FIGS. 16A and 16B illustrate a different example of correction of music.
Figure 16B:
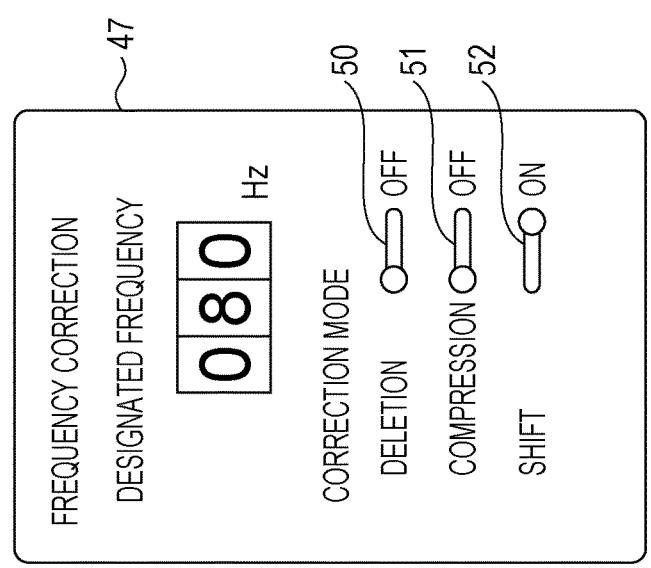

Next, in the example illustrated in FIGS. 16A and 16B, a process of shifting the frequencies to be higher than the designated frequency is performed as the process performed such that the speaker 25 does not output music at a frequency that is equal to or less than the designated frequency.

The example illustrated in FIG. 16A indicates that the frequencies are moved to be higher than 80 hertz for the entire pre-correction music transmitted to the hearable device 2 in the case where the designated frequency is set to 80 hertz. In the process of moving the frequencies, the frequency band of the entire music is shifted by the same frequency.

More specifically, in the case where the frequency correction button 44 is set to OFF, music at 20 hertz to 20000 hertz is output from the speaker 25. In the case where the frequency correction button 44 is set to ON, on the other hand, correction is performed to shift the frequencies of the entire music such that data on music at a frequency of 80 hertz or less are moved to be higher than 80 hertz. In this example, the frequencies of the entire music are shifted by 60 hertz to 80 hertz to 20060 hertz. For example, music at 100 hertz is converted into music at 160 hertz. Meanwhile, music at 10000 hertz is converted into music at 10060 hertz, for example. As a result, music at higher than 80 hertz is output from the speaker 25.

Besides the process of moving the frequencies as in FIG. 16A, examples of the process of shifting the frequencies include a process of switching the frequencies.

In the process of switching the frequencies, the frequency band of the entire music is converted into a different frequency band. For example, the frequency band of the entire music, of 20 hertz to 20000 hertz, is switched to a different frequency band of 100 hertz to 10000 hertz. In addition, in the case where the frequency band of the entire music is known beforehand as 20 hertz to 1000 hertz, the frequency band is multiplied by four to be switched to 80 hertz to 4000 hertz.

In addition, the music correction section 305 may support, as a mode of correcting music, only one of the deletion process in FIG. 9, the compression process in FIGS. 15A and 15B, and the shift process in FIGS. 16A and 16B, but may support two or three of such processes.

In the case where the three processes are supported, the correction setting screen 47 allows selection of one of the deletion process, the compression process, and the shift process as illustrated in FIG. 16B, for example. In the example illustrated in FIG. 16B, the shift process selected with the deletion mode button 50 set to OFF, with the compression mode button 51 set to OFF, and with a shift mode button 52 set to ON. Setting of the deletion mode button 50, the compression mode button 51, and the shift mode button 52 is switchable between ON and OFF in accordance with selection by the user, and one of the three buttons is set to ON.

In the brain wave measurement system 1 according to the present embodiment, as has been described above, when music is output while brain waves are being measured, the user terminal 3 corrects the music, and outputs the corrected music from the hearable device 2 to the user. Correction of the music is performed such that sound at a frequency that is equal to or less than the designated frequency is not output.

In the present embodiment, alternatively, the correction section 305 may perform correction before brain waves are measured, and data after being corrected may be stored in the post-correction data storage section 304. In this case, in addition, the music correction section 305 may correct music without the music playback section 202 playing back the music. With the post-correction data storage section 304 storing data on post-correction music, corrected music may be output from the speaker 25 using the data on music stored in the post-correction data storage section 304 at the time when the music is initially played back, for example.

In the example discussed above, in addition, the designated frequency is changeable by an operation by the user.

In the present embodiment, an initial value of the designated frequency may be set in advance, or the designated frequency may be set as a fixed value in advance. In this case, as in the example discussed above, the value of the designated frequency may be set to the maximum value (e.g. 80 hertz) of the frequency of common brain waves. However, the present embodiment is not limited thereto.

For example, the value of the designated frequency may be set in accordance with the characteristics of the user or a state desired by the user (e.g. a concentrating state, a relaxed state, or the like).

For example, it is assumed that, in the case where the user uses the hearable device 2 for a certain period (e.g. one month), the maximum value of measured brain waves is 70 hertz. In this case, it is less likely that the frequency of music overlaps the frequency of the brain waves if the frequency of the music is higher than 70 hertz. Thus, the hearable device 2 or the user terminal 3 may set the value of the designated frequency to 70 hertz on the basis of the value of the brain waves measured for the certain period. In this case, correction is performed such that music at a frequency of 70 hertz or less is not output.

In addition, in the case where the user designates a concentrating state as a desired state, for example, the hearable device 2 outputs music that brings the user to a concentrating state. It is considered that α-waves appear in a concentrating state, and the frequency band of α-waves is 13 to 8 hertz. Thus, the designated frequency for a case where the user desires a concentrating state may be set in advance to 13 hertz, which is the maximum value of common α-waves. In this case, correction is performed such that music at a frequency of 13 hertz or less is not output.

In the example discussed above, in addition, the hearable device 2 outputs music. However, the hearable device 2 according to the present embodiment is not limited thereto, and it is only necessary that the hearable device 2 according to the present embodiment should output sound (sonic waves). For example, the hearable device 2 may output a human conversation, a call of an animal, noise, or the like. Examples of the sound output from the hearable device 2 also include sound that is outside the human audible range. The music correction section 305 corrects such sound so as not to overlap the frequency of brain waves.

In the example discussed above, further, the user selects a desired state, and brain waves are measured while music that brings the user to the desired state is output to the user. However, the present embodiment is not limited thereto. For example, brain waves may be measured while music is output to the user without the user selecting a desired state.

Additionally, the present embodiment is applicable to a configuration in which brain waves are measured while sound is output.

Different Example of Configuration of Brain Wave Measurement System

In the example discussed above, the hearable device 2 includes the functional sections illustrated in FIG. 4, and the user terminal 3 includes the functional sections illustrated FIG. 5. In the present embodiment, however, the bearable device 2 may include some or all of the functional sections of the user terminal 3 illustrated in FIG. 5.

Specifically, the hearable device 2 may include a reception unit such as a button, and receive a command to correct music, for example. In addition, the hearable device 2 may receive a command for correction with a voice uttered by the user input to the hearable device 2, for example, instead of the user performing various operations on the screen of the user terminal 3. In this case, the hearable device 2 may be considered as an example of the information processing apparatus.

In addition, the hearable device 2 may correct music, or store data on pre-correction music or data on post-correction music. Also in the case where the hearable device 2 includes some or all of the functional sections of the user terminal 3, the various functional sections are implemented with the CPU 31 executing programs etc. In addition, data on music are stored in a non-volatile storage section, for example.

Further, while the hearable device 2 has an earphone shape in the example discussed above, the hearable device 2 is not limited to such a shape. For example, the hearable device 2 may have a headphone shape, or may be a device that is used without contact by the user.

The programs for implementing the exemplary embodiment of the present disclosure may be not only provided by a communication unit but also provided as being stored in a recording medium such as a CD-ROM.

Further, while various exemplary embodiments and modifications have been described above, it is a matter of course that such exemplary embodiments and modifications may be combined with each other.

In addition, the present disclosure is not limited to the exemplary embodiment described above in any way, and may be implemented in a variety of forms without departing from the scope and spirit of the present disclosure.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   a sensor configured to measure brain waves of a user;
   a speaker configured to transmit music having a frequency band to the user while the brain waves of the user are being measured; and
   a processor configured to receive a command from the user to adjust the frequency band of the music to provide music having an adjusted frequency band, if the frequency band of the music transmitted by the speaker meets a pre-determined condition, so that overlapping of frequencies in the adjusted frequency band and frequencies of the brain waves of the user is reduced,
   wherein the processor is further configured to:
      increment a count of occurrence every time when it is determined that at least one frequency in the frequency band of the music is less than a maximum frequency value of the brain waves, and
      in a case in which it is determined that the count of occurrence is more than a predetermined threshold value, the predetermined threshold value being greater than one, prompt the user to provide the command to adjust the frequency band of the music or automatically adjust the frequency band of the music.

2. The information processing system according to claim 1, wherein the user is prompted to provide the command to adjust the frequency band of the music when a duration of the music transmitted at frequencies equal to or less than a maximum frequency value of the brain waves reaches a threshold.

3. The information processing system according to claim 1, wherein the processor is configured to receive not only the command from the user to adjust the frequency band of the music but also a command from the user not to adjust the frequency band of the music when the user is prompted to command adjustment of the frequency band music.

4. The information processing system of claim 1, wherein the speaker is a head-phone type or an ear-phone type.

5. An information processing system comprising:
   a sensor configured to measure brain waves of a user;
   a speaker configured to transmit a music to the user, wherein the music has a frequency band and is transmitted to the user while the brain waves of the user are being measured; and
   a processor configured to receive a command from the user to adjust the frequency band of the music to provide music having an adjusted frequency band, so that overlapping of frequencies in the adjusted frequency band of the music and frequencies of the brain waves of the user is reduced,
   wherein the processor is further configured to:
      increment a count of occurrence every time when it is determined that at least one frequency in the frequency band of the music is less than a maximum frequency value of the brain waves, and
      in a case in which it is determined that the count of occurrence is more than a predetermined threshold value, the predetermined threshold value being greater than one, prompt the user to provide the command to adjust the frequency band of the music or automatically adjust the frequency band of the music.

6. The information processing system according to claim 5, wherein the frequency band of the music includes frequencies equal to or less than a maximum frequency value of the brain waves, and wherein the processor is configured to remove from the frequency band of the music frequencies that are equal to or less than the maximum frequency value of the brain waves.

7. The information processing system according to claim 5, wherein the processor is configured to adjust the frequency band of the music by compressing the frequency band such that each frequency in the adjusted frequency band of the music is greater than a maximum frequency value of the brain waves.

8. The information processing system according to claim 5, wherein the processor is configured to adjust the frequency band of the music by shifting the frequency band such that each frequency in the adjusted frequency band of the music is greater than a maximum frequency value of the brain waves.

9. The information processing system according to claim 5, further comprising: a memory configured to save the music having the adjusted frequency band, wherein the speaker is further configured to transmit the music having the adjusted frequency band to the user.

10. The information processing system of claim 5, wherein the speaker is a head-phone type or an ear-phone type.

11. An information processing apparatus comprising:
a sensor configured to measure brain waves of a user;
a speaker configured to transmit a music to the user, wherein the music has a frequency band and is transmitted to the user while the brain waves of the user are being measured; and
a processor configured to receive a command from the user to adjust the frequency band of the music to provide music having an adjusted frequency band, if the frequency band of the music include frequencies that are equal to or less than a pre-determined frequency threshold, so that overlapping of frequencies in the adjusted frequency band of the music and frequencies of the brain waves of the user is reduced,
wherein the processor is further configured to:
increment a count of occurrence every time when it is determined that at least one frequency in the frequency band of the music is less than a maximum frequency value of the brain waves, and
in a case in which it is determined that the count of occurrence is more than a predetermined threshold value, the predetermined threshold value being greater than one, prompt the user to provide the command to adjust the frequency band of the music or automatically adjust the frequency band of the music.

12. The information processing apparatus of claim 11, wherein the speaker is a head-phone type or an ear-phone type.

13. An information processing apparatus comprising:
a sensor configured to measure brain waves of a user; and
a speaker configured to transmit music having an adjusted frequency band to the user while the brain waves are being measured, wherein the adjusted frequency band of the music is obtained by adjusting a frequency band of music previously transmitted by the speaker to the user, wherein the frequency band meets a pre-determined condition, so that overlapping of frequencies in the adjusted frequency band of the music and frequencies of the brainwaves of the user is reduced; and
a processor configured to:
increment a count of occurrence every time when it is determined that at least one frequency in the frequency band of the music is less than a maximum frequency value of the brain waves, and
in a case in which it is determined that the count of occurrence is more than a predetermined threshold value, the predetermined threshold value being greater than one, prompt the user to provide the command to adjust the frequency band of the music or automatically adjust the frequency band of the music.

14. The information processing apparatus according to claim 13, wherein the frequency band of the music previously transmitted is adjusted if a duration of the music previously transmitted at frequencies equal to or less than a maximum frequency value of the brain waves reaches a threshold.

15. The information processing apparatus of claim 13, wherein the speaker is a head-phone type or an ear-phone type.

16. A non-transitory computer readable medium storing a program causing a computer to execute process, the process comprising:
measuring brain waves of a user;
transmitting music having a frequency band to the user while the brain waves of the user are being measured;
receiving a command from the user to adjust the frequency band of the music to provide music having an adjusted frequency band, if the frequency band of the music transmitted by the speaker meets a pre-determined condition, so that overlapping of frequencies in the adjusted frequency band and frequencies of the brain waves of the user is reduced;
incrementing a count of occurrence every time when it is determined that at least one frequency in the frequency band of the music is less than a maximum frequency value of the brain waves, and
in a case in which it is determined that the count of occurrence is more than a predetermined threshold value, the predetermined threshold value being greater than one, prompting the user to provide the command to adjust the frequency band of the music or automatically adjusting the frequency band of the music.

17. A non-transitory computer readable medium storing a program causing a computer to execute a process, the process comprising:
measuring brain waves of a user;
transmitting music having an adjusted frequency band to the user while the brain waves are being measured, wherein the adjusted frequency band of the music is obtained by adjusting music previously transmitted by the speaker that has a frequency band that meets a pre-determined condition, so that overlapping of frequencies in the adjusted frequency band and frequencies of the brain waves of the user is reduced;
incrementing a count of occurrence every time when it is determined that at least one frequency in the frequency band of the music is less than a maximum frequency value of the brain waves, and
in a case in which it is determined that the count of occurrence is more than a predetermined threshold value, the predetermined threshold value being greater than one, prompting the user to provide the command to adjust the frequency band of the music or automatically adjusting the frequency band of the music.

* * * * *

UNITED STATES PATENT AND TRADEMARK OFFICE
CERTIFICATE OF CORRECTION

Page 1 of 2

PATENT NO. : 11,768,539 B2
APPLICATION NO. : 16/400314
DATED : September 26, 2023
INVENTOR(S) : Tsutomu Kimura It is certified that error appears in the above-identified patent and that said Letters Patent is hereby corrected as shown below:

In the Specification

In Column 5, Line 1 reads "The functional sections constituting the bearable device 2" but it should read "The functional sections constituting the hearable device 2."

In Column 5, Line 4 reads "...the case where the bearable device 2 is implemented..." but it should read "...the case where the hearable device 2 is implemented..."

In Column 5, Line 35 reads "...music to be transmitted to the bearable device 2." but it should read "...music to be transmitted to the hearable device 2."

In Column 6, Line 44 reads "...terminal 3 to the bearable device 2, needs..." but it should read "...terminal 3 to the hearable device 2, needs..."

In Column 7, Line 27 reads "...pre-correction data storage section 303, to the bearable..." but it should read "...pre-correction data storage section 303, to the hearable..."

In Column 8, Line 12 reads "...in step 103, the bearable device continuously..." but it should read "...in step 103, the hearable device continuously..."

In Column 9, Line 14 reads "In the case where an affirmative de termination (YES)..." but it should read "In the case where an affirmative determination (YES)..."

In Column 10, Line 33 reads "...are transmitted to the bearable device 2." but it should read "...are transmitted to the hearable device 2."

In Column 10, Line 40 reads "...transmitted to the bearable device 2." but it should read "...transmitted to the hearable device 2."

Signed and Sealed this
Fifth Day of March, 2024

Katherine Kelly Vidal
*Director of the United States Patent and Trademark Office*

CERTIFICATE OF CORRECTION (continued)
U.S. Pat. No. 11,768,539 B2

In Column 11, Line 24 reads "...music transmitted to the bearable device 2..." but it should read "...music transmitted to the hearable device 2..."

In Column 12, Line 7 reads "...the bearable device 2 becomes equal to..." but it should read "...the hearable device 2 becomes equal to..."

In Column 12, Line 11 reads "...is transmitted to the bearable device 2..." but it should read "...in the hearable device 2..."

In Column 12, Line 15 reads "...music are transmitted to bearable device 2..." but it should read "...music are transmitted to hearable device 2..."

In Column 13, Line 3 reads "...notification section 306 commands to the bearable device 2..." but it should read "...notification section 306 commands to the hearable device 2..."

In Column 17, Line 11 reads "In the present embodiment, however, the bearable.." but it should read "In the present embodiment, however, the hearable..."